(12) United States Patent
Manion et al.

(10) Patent No.: US 7,596,625 B2
(45) Date of Patent: *Sep. 29, 2009

(54) PEER-TO-PEER GROUPING INTERFACES AND METHODS

(75) Inventors: Todd R. Manion, Redmond, WA (US); Jeremy L. Dewey, Redmond, WA (US); Robert D. Donner, Sammamish, WA (US); Scott A. Senkeresty, Duvall, WA (US); Upshur Parks, III, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 946 days.

This patent is subject to a terminal disclaimer.

(21) Appl. No.: 10/351,905

(22) Filed: Jan. 27, 2003

(65) Prior Publication Data

US 2004/0148333 A1    Jul. 29, 2004

(51) Int. Cl.
    *G06F 15/173* (2006.01)
(52) U.S. Cl. ...................................................... 709/232
(58) Field of Classification Search ................ 709/223, 709/203, 205, 227, 232; 714/47, 48, 712
    See application file for complete search history.

(56) References Cited

U.S. PATENT DOCUMENTS

| | | | |
|---|---|---|---|
| 5,369,705 A | 11/1994 | Bird et al. | |
| 5,371,794 A | 12/1994 | Diffie et al. | |
| 5,386,542 A | 1/1995 | Brann et al. | |
| 5,712,914 A | 1/1998 | Aucsmith et al. | |
| 5,748,736 A | 5/1998 | Mittra | |
| 5,761,421 A * | 6/1998 | van Hoff et al. | 709/223 |
| 5,806,075 A * | 9/1998 | Jain et al. | 707/201 |
| 5,832,514 A | 11/1998 | Norin et al. | |
| 5,854,898 A | 12/1998 | Riddle | |
| 5,901,227 A | 5/1999 | Perlman | |
| 5,907,685 A | 5/1999 | Douceur | |
| 5,917,480 A | 6/1999 | Tafoya et al. | |

(Continued)

FOREIGN PATENT DOCUMENTS

EP        1248441        10/2002

(Continued)

OTHER PUBLICATIONS

Adam Langley, *The Freenet Protocol*, The Free Network Project, at http://freenet.sourceforge.net/index.php?page=protocol (last visited May 21, 2001).

(Continued)

*Primary Examiner*—David Y Eng
(74) *Attorney, Agent, or Firm*—Marshall, Gerstein & Borun LLP

(57) ABSTRACT

Application programming interfaces and methods that provide group management in a peer-to-peer (P2P) network are provided. More specifically, new and improved P2P application programming interfaces (APIs) and methods for the creation and access of groups, the retrieval of member and group information, the addition, modification, deletion and management of records (data), the importation and exportation of group data, the direct communication between members, the addition of a security provider to a group, the setting and retrieval of presence information, the registering for event notifications, and other utility and support functions are presented. Each of these interfaces utilize various parameters that are passed in from an application program that uses these interfaces to manage and utilize groups. The interfaces return a value that indicates the success or failure of the function. For failures, the interfaces provide an indication as to the problem resulting in the failure.

80 Claims, 2 Drawing Sheets

U.S. PATENT DOCUMENTS

| | | | |
|---|---|---|---|
| 5,922,074 A | 7/1999 | Richard et al. | |
| 5,933,849 A | 8/1999 | Srbljic et al. | |
| 5,944,794 A | 8/1999 | Okamoto et al. | |
| 5,982,898 A | 11/1999 | Hsu et al. | |
| 5,987,376 A | 11/1999 | Olson et al. | |
| 6,012,096 A | 1/2000 | Link et al. | |
| 6,016,505 A | 1/2000 | Badovinatz et al. | |
| 6,044,350 A | 3/2000 | Weiant, Jr. et al. | |
| 6,078,948 A | 6/2000 | Podgorny et al. | |
| 6,081,845 A | 6/2000 | Kanemaki et al. | |
| 6,085,320 A | 7/2000 | Kaliski, Jr. | |
| 6,088,805 A | 7/2000 | Davis et al. | |
| 6,092,201 A | 7/2000 | Turnbull et al. | |
| 6,097,811 A | 8/2000 | Micali | |
| 6,108,687 A | 8/2000 | Craig | |
| 6,128,740 A | 10/2000 | Curry et al. | |
| 6,134,658 A | 10/2000 | Multerer et al. | |
| 6,141,760 A | 10/2000 | Abadi et al. | |
| 6,148,383 A | 11/2000 | Micka et al. | |
| 6,155,840 A | 12/2000 | Sallette | |
| 6,163,809 A | 12/2000 | Buckley | |
| 6,205,481 B1 | 3/2001 | Heddaya et al. | |
| 6,216,110 B1 | 4/2001 | Silverberg | |
| 6,237,025 B1 | 5/2001 | Ludwig | |
| 6,266,420 B1 | 7/2001 | Langford et al. | |
| 6,269,099 B1 | 7/2001 | Borella et al. | |
| 6,311,209 B1 | 10/2001 | Olson et al. | |
| 6,336,141 B1 * | 1/2002 | Fujiyama et al. | 709/224 |
| 6,351,813 B1 | 2/2002 | Mooney et al. | |
| 6,363,352 B1 | 3/2002 | Dailey et al. | |
| 6,470,375 B1 | 10/2002 | Whitner et al. | |
| 6,490,253 B1 * | 12/2002 | Miller et al. | 370/241 |
| 6,526,411 B1 | 2/2003 | Ward | |
| 6,529,950 B1 | 3/2003 | Lumelsky et al. | |
| 6,532,217 B1 | 3/2003 | Alkhatib et al. | |
| 6,560,636 B2 | 5/2003 | Cohen et al. | |
| 6,581,110 B1 | 6/2003 | Harif et al. | |
| 6,636,854 B2 | 10/2003 | Dutta et al. | |
| 6,636,889 B1 | 10/2003 | Estrada et al. | |
| 6,653,933 B2 * | 11/2003 | Raschke et al. | 370/203 |
| 6,654,796 B1 | 11/2003 | Slater et al. | |
| 6,658,568 B1 | 12/2003 | Ginter et al. | |
| 6,675,205 B2 | 1/2004 | Meadway et al. | |
| 6,675,261 B2 | 1/2004 | Shandony | |
| 6,683,865 B1 | 1/2004 | Garcia-Luna-Aceves et al. | |
| 6,701,344 B1 | 3/2004 | Holt et al. | |
| 6,714,966 B1 | 3/2004 | Holt et al. | |
| 6,728,753 B1 | 4/2004 | Parasnis et al. | |
| 6,745,178 B1 | 6/2004 | Emens et al. | |
| 6,748,530 B1 | 6/2004 | Aoki et al. | |
| 6,754,829 B1 | 6/2004 | Butt et al. | |
| 6,775,782 B1 | 8/2004 | Buros et al. | |
| 6,791,582 B2 | 9/2004 | Linsey et al. | |
| 6,801,604 B2 | 10/2004 | Maes et al. | |
| 6,823,327 B1 | 11/2004 | Klug et al. | |
| 6,912,622 B2 | 6/2005 | Miller | |
| 6,920,455 B1 | 7/2005 | Weschler | |
| 6,968,179 B1 | 11/2005 | De Vries | |
| 6,976,258 B1 | 12/2005 | Goyal et al. | |
| 6,981,043 B2 | 12/2005 | Botz et al. | |
| 6,983,400 B2 * | 1/2006 | Volkov | 714/38 |
| 6,990,514 B1 * | 1/2006 | Dodrill et al. | 709/206 |
| 7,062,681 B2 * | 6/2006 | Larsson et al. | 714/39 |
| 7,065,579 B2 | 6/2006 | Traversat et al. | |
| 7,065,587 B2 | 6/2006 | Huitema et al. | |
| 7,068,789 B2 | 6/2006 | Huitema et al. | |
| 7,073,132 B1 * | 7/2006 | Rydahl et al. | 715/745 |
| 7,130,999 B2 | 10/2006 | Yasala et al. | |
| 7,139,760 B2 * | 11/2006 | Manion et al. | 707/10 |
| 7,159,223 B1 | 1/2007 | Comeau et al. | |
| 7,181,620 B1 | 2/2007 | Hur | |
| 7,185,194 B2 | 2/2007 | Morikawa et al. | |
| 7,197,049 B2 | 3/2007 | Engstrom et al. | |
| 7,213,060 B2 * | 5/2007 | Kemp et al. | 709/222 |
| 7,272,636 B2 | 9/2007 | Pabla | |
| 7,299,351 B2 | 11/2007 | Huitema et al. | |
| 2001/0003191 A1 | 6/2001 | Kovacs et al. | |
| 2001/0035976 A1 | 11/2001 | Poon | |
| 2001/0053213 A1 | 12/2001 | Truong et al. | |
| 2002/0073204 A1 | 6/2002 | Dutta et al. | |
| 2002/0078243 A1 | 6/2002 | Rich et al. | |
| 2002/0097267 A1 | 7/2002 | Dinan et al. | |
| 2002/0140730 A1 | 10/2002 | Linsey et al. | |
| 2002/0143989 A1 | 10/2002 | Huitema et al. | |
| 2002/0144149 A1 | 10/2002 | Hanna et al. | |
| 2002/0154172 A1 | 10/2002 | Linsey et al. | |
| 2002/0184358 A1 | 12/2002 | Traversat et al. | |
| 2002/0188657 A1 | 12/2002 | Traversat et al. | |
| 2002/0188881 A1 | 12/2002 | Liu et al. | |
| 2002/0194484 A1 | 12/2002 | Bolosky et al. | |
| 2003/0014485 A1 | 1/2003 | Banatwala | |
| 2003/0036941 A1 | 2/2003 | Leska et al. | |
| 2003/0055892 A1 | 3/2003 | Huitema et al. | |
| 2003/0056093 A1 | 3/2003 | Huitema et al. | |
| 2003/0056094 A1 | 3/2003 | Huitema et al. | |
| 2003/0088544 A1 | 5/2003 | Kan et al. | |
| 2003/0126027 A1 | 7/2003 | Nelson et al. | |
| 2003/0135629 A1 | 7/2003 | Sasaki et al. | |
| 2003/0140119 A1 | 7/2003 | Acharya et al. | |
| 2003/0147386 A1 | 8/2003 | Zhang et al. | |
| 2003/0191753 A1 | 10/2003 | Hoch | |
| 2003/0196060 A1 | 10/2003 | Miller | |
| 2003/0217073 A1 | 11/2003 | Walther et al. | |
| 2004/0064693 A1 | 4/2004 | Pabla et al. | |
| 2004/0078436 A1 | 4/2004 | Demsky et al. | |
| 2004/0082351 A1 | 4/2004 | Westman | |
| 2004/0088325 A1 | 5/2004 | Elder et al. | |
| 2004/0100953 A1 | 5/2004 | Chen et al. | |
| 2004/0111423 A1 | 6/2004 | Irving et al. | |
| 2004/0111469 A1 | 6/2004 | Manion et al. | |
| 2004/0111515 A1 | 6/2004 | Manion et al. | |
| 2004/0111525 A1 | 6/2004 | Berkland et al. | |
| 2004/0117446 A1 | 6/2004 | Swanson | |
| 2004/0120344 A1 | 6/2004 | Sato et al. | |
| 2004/0122898 A1 | 6/2004 | Srinivasa | |
| 2004/0122901 A1 | 6/2004 | Sylvain | |
| 2004/0128350 A1 | 7/2004 | Topfl et al. | |
| 2004/0133640 A1 | 7/2004 | Yeager et al. | |
| 2004/0141005 A1 | 7/2004 | Banatwala et al. | |
| 2004/0143603 A1 | 7/2004 | Kaufmann et al. | |
| 2004/0148333 A1 | 7/2004 | Manion et al. | |
| 2004/0148611 A1 | 7/2004 | Manion et al. | |
| 2004/0172455 A1 | 9/2004 | Green et al. | |
| 2004/0172456 A1 | 9/2004 | Green et al. | |
| 2004/0184445 A1 | 9/2004 | Burne | |
| 2004/0205243 A1 | 10/2004 | Hurvig et al. | |
| 2004/0242329 A1 | 12/2004 | Blackburn et al. | |
| 2004/0249970 A1 | 12/2004 | Castro et al. | |
| 2004/0260771 A1 | 12/2004 | Gusler et al. | |
| 2005/0004984 A1 | 1/2005 | Simpson | |
| 2005/0009537 A1 | 1/2005 | Crocker et al. | |
| 2005/0027805 A1 | 2/2005 | Aoki | |
| 2005/0038856 A1 | 2/2005 | Krishnasamy et al. | |
| 2005/0066001 A1 | 3/2005 | Benco et al. | |
| 2005/0080768 A1 | 4/2005 | Zhang et al. | |
| 2005/0080859 A1 | 4/2005 | Lake | |
| 2005/0086300 A1 | 4/2005 | Yeager et al. | |
| 2005/0102245 A1 | 5/2005 | Edlund et al. | |
| 2005/0102356 A1 | 5/2005 | Manion et al. | |
| 2005/0114487 A1 | 5/2005 | Peng et al. | |
| 2005/0125529 A1 | 6/2005 | Brockway et al. | |
| 2005/0125560 A1 | 6/2005 | Brockway et al. | |
| 2005/0171799 A1 | 8/2005 | Hull et al. | |
| 2005/0198173 A1 | 9/2005 | Evans | |

| | | | |
|---|---|---|---|
| 2005/0235038 | A1 | 10/2005 | Donatella et al. |
| 2008/0031460 | A1 | 2/2008 | Brookner et al. |

FOREIGN PATENT DOCUMENTS

| | | |
|---|---|---|
| GB | 2378268 | 2/2003 |
| JP | 2002197246 | 11/2001 |
| JP | 2002335269 | 11/2002 |
| WO | WO-0120450 | 3/2001 |
| WO | WO-2005/046164 A1 | 5/2005 |

OTHER PUBLICATIONS

Philip J. Erdelsky, *The Birthday Paradox*, EFG, at http://www.efgh.com/math/birthday.htm (last visited Mar. 8, 2002).

*Red-Black Tree*, National Institute of Standards and Technology, at http://www.nist.gov/dads/HTML/redblack.html (last visited Mar. 5, 2002).

Lai, Kevin, and Mary Baker, *Measuring Link Bandwidths Using a Deterministic Model of Packet Delay*, at Department of Computer Science at Stanford University, 13 pages, Oct. 2000.

Rowstron, Antony, and Peter Druschel, *Pastry: Scalable, distributed object location and routing for large-scale peer-to-peer systems*, at Microsoft Research, Ltd., St. George House and Rice University, 20 pages, 2001.

Druschel, Peter, and Antony Rowstron, *PAST: A large-scale, persistent peer-to-peer storage utility*, at Rice University and Microsoft Research, 6 pages, 2001.

Rowstron, Antony, and Peter Druschel, *Storage management and caching in PAST, a large-scale, persistent peer-to-peer storage utility*, at Microsoft Research, Ltd., St. George House and Rice University, 14 pages, 2001.

Rowstron, Antony, Anne-Marie Kermarrec, Peter Druschel, and Miguel Castro, *SCRIBE: The design of a large-scale event notification infrastructure*, at Microsoft Research, Ltd., St. George House and Rice University, 20 pages, 2001.

Dabek, Frank, Emma Brunskill, M.Frans Kaashoek, David Karger, Robert Morris, Ion Stoica, and Hari Balakrishnan, *Building Peer-to-Peer Systems With Chord, a Distributed Lookup Service*, at MIT Laboratory for Computer Science, 6 pages, at http://pdos.Ics.mit.edu/chord, 2001.

Ellison, C., *SPKI Requirements*, (The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Soceity 1999), at http://www.ietf.org/rfc/rfc2693.txt?number=2693 (last visited Aug. 6, 2001).

"About Presentation Broadcasting," 3 pages printed Jul. 1, 2005 from http://office.microsoft.com/en-us/assistance/HP052411931033.aspx.

"At What Cost Pervasive? A Social Computing View of Mobile Computing Systems," IBM Research: vol. 38, No. 4, 1999, Pervasive Computing (28 pgs.).

"Connecting and Extending Peer-to-Peer Networks," Lion Share White Paper, dated Oct. 2004, 32 pages, http://lionshare.its.psu.edu/main/info/docspresentation/LionshareWP.pdf.

"Design Explorations," IBM Research: Social Computing Group (4 pgs.), Apr. 19, 2005.

"IBM Lotus Instant Messaging and Web Conferencing," IBM Software—IBM Lotus Instant Messaging and Web Conferencing home page (3 pgs.) Apr. 19, 2005.

"IBM Workplace Collaboration Services Overview Guide" dated Jan. 2005, 2 pages. (Printed from ftp://ftp.lotus.com/pub/lotusweb/IGM_Workplace_collaboration_services_g224733301_118.pdf on Jul. 1, 2005).

"*METEOR-S Web Service Discovery Infrastructure*," A Component of the METEOR-S System on Semantic Web Services and Processes;
METEOR-S Web Service Discovery Infrastructure (MWSDI); dated Dec. 14, 2005, 2 pages; http://lsdis.cs.uga.edu/proj/meteor/mwsdi.html.

"Microsoft Computer Dictionary," Fifth Edition, Microsoft Press, 2002p pp. 31, 238-239, 424, 467, 1999.

"Microsoft, Groove Networks to Combine Forces to Create Anytime, Anywhere Collaboration," Microsoft Presspass-Information for Journalists, retrieved from http://www.microsoft.com/prespass/features/2005/mar05/03-10GrooveQA.asp on May 31, 2005 (9 pages).

"*Microsoft Overhauls Longhorn Drivers for Usability, Connectivity*," eWeek.com Enterprise News & Reviews, dated Dec. 14, 2005, 5 pages; http://www.eweek.com/article2/0, 1759,1654462,00.asp.

"News: Sun Incorporating JXTA into Products," java.net The Source for Java Technology Collaboration, Jan. 30, 2004, retrieved from http://today.java.net.pub/n/SunKXTA on Jun. 2, 2005 (1 page).

"*Presence and Awareness Services*," Ramiro Liscano, Professor, SITE, University of Ottawa, 89 pages, http://www.site.uottawa.ca/~rliscano/tutorials/PresenceAwarenessServices.pdf.

"Products: Groove Virtual Office FAX," Groove Networks, retrieved from http://www.groove.net/index.cfm?pagename=VO_FAX on May 31, 2005 (5 pages).

"Products: Groove Virtual Office," Groove Networks, retrieved from http://www.groove.net/index.cfm/pagename/VirtualOFfice on May 31, 2005 (2 pages).

"Products: Why Grove," Groove Networks, retrieved from http://www.grove.net/index.cfm?pagename=Products_Overview on May 31, 2005 (2 pages).

"Project JXTA: An Open, Innovative Collaboration," Sun Microsystems, Inc. Apr. 25, 2001, (pp. 1-5).

"Project JXTA: Technical Shell Overview," Sun Microsystems, Inc. Apr. 25, 2001; retrieved from http://www.jxta.org/project/www.docs/TechShellOverview.pdf on Aug. 10, 2006.

"Project JXTA: Technical Specification," Version 1.0, Sun Microsystems, Inc., Apr. 25, 2001; retrieved from http://download.jxta.org/files/documents/27/12/JXTA-Spec.pdf on Aug. 10, 2006.

"Publication Related to Pastry," http://research.microsoft.com/~antr/Pastry/pubs.htm.

The Gnutella Protocol Specification v0.4, http://www.clip2.com.

Adamic, L., "P2P Search that Scales," pre-presentation description for talk on Nov. 7, 2001, http://conferences.oreillynet.com/cs/p2web2001/view.

Balachander et al., "Early Measurements of a Cluster-Based Architecture for P2P Systems", IMW '01, ACM, pp. 105-109 (2001).

Beatty et al., "*Web Services Dynamic Discovery (WS-Discovery)*," Microsoft Corporation, dated Apr. 2005, 42 pages; http://msdn.microsoft.com/library/en-us/dnglobspec/html/WS-Discovery.pdf.

Bolcer et al., "Peer-to-Peer Architectures and the Magi™ Open-Source Infrastructure," Endeavors Technology, Inc., Dec. 6, 2000.

Bouvin, "Designing User Interfaces for Collaborative Web-Based Open Hypermedia," in Proceedings of the Eleventh ACM Conference on Hypertext and Hypermedia, pp. 230-231 (San Antonio, TX, 2000).

Boyer et al., "Virtual Social Clubs: Meeeting Places for the Internet Community," IEEE International Conference on Multimedia Computing and Systems, pp. 297-301 (Florence, Italy, Jun. 7-11, 1999).

Castro et al., "*Secure Routing For Structured Peer-to-Peer Overlay Networks,*" Usenix, OSDI '02 Paper (OSDI '02 Tech Program Index) pp. 299-314 of the Proceedings, Fifth Symposium on Operating Systems Design and Implementation (OSDI 2002) 33 pages, http://www.usenix.org/events/osdi02/tech/full_papers/castro/castro_html/.

Castro et al., "*Topology-Aware Routing In Structured Peer-to-Peer Overlay Networks*," Technical Report MSR-TR-2002-82, Microsoft Research, Microsoft Corporation, http://www.research.microsoft.com.

Cheng et al., "Hutchworld: Lessons Learned. A Collaborative Project: Fred Hutchinson Cancer Research Center & Microsoft Research," in Proceedings of Second International Conference on Virtual Worlds (VW 2000), pp. 1-2 (Paris, France, Jul. 5-6, 2000). http://research.microsoft.com/scg/papers/hutchvw2000.pdf.

Cheung, "*Chatopus for Palm OS, Using IM Bots for Jabber,*" Chatopus-Palm OS Instant Messaging Client for XMPP/Jabber, Dated Oct. 20, 2002 (Last updated: Jun. 25, 2005), 6 pages, http://www.chatopus.com/articles/bots.html.

Clark et al., "Freenet: A Distributed Anonymous Information Storage and Retrieval System", H. Federrath (Ed.), Anonymity 2000, LNCS 2009, pp. 46-66 (2001).

Cugola et al., "Peer to Peer for Collaborative Applications," in Proceedings of the 22nd International Conference on Distributed Computing Systems Workshop (ICDCS'02), pp. 359-364 (Vienna, Austria, Jul. 2-5, 2002).

Dorohonceanu et al., "A Desktop Design for Synchronous Collaboration," in Proceedings of the Graphics Interface '99 (GI'99), pp. 27-35 (Kingston, Ontario, Canada, Jun. 1999).

Duhr, "Oberflachenelemente in interaktiven und kooperativen anwendungen," Universitat Oldenburg, Department of Information Systems Thesis (Aug. 2000).

European Search Report; EP 02 00 5770; Munich; Aug. 9, 2005.

Farnham et al., "Supporting Sociability in a Shared Browser," in Proceedings of Interact Conference (Tokyo, Japan, Jul. 2001) http://research.microsoft.com/scg/papers/sharedbrowsinginteract.pdf, pp. 1-8.

Gagnes et al., "*Discovering Semantic Web Services In Dynamic Environments*," Norwegian Defence Research Establishment (FFI), University of Oslo, Department of Informatics, Oslo, Norway, 4 pages; http://wscc.info/p51561/files/paper61.pdf.

Garcia et al., "Extending a Collaborative Architecture to Support Emotional Awareness," EBAA '99—Workshop on Emotion-Based Agent Architectures, pp. 46-52 (May 2, 1999).

Gong, Li. "Project JXTA: A Technology Overview," Sun Microsystems, Inc., Apr. 25, 2001; retrieved from http://download.jxta.org/files/documents/27/35/JXTA-Tech-Overview.pdf on Aug. 10, 2006.

Greenberg et al, "Using a Room Metaphor to Ease Transitions in Groupware," University of Calgary, Department of Computer Science, Research Report 98/611/02, 31 pages (1998).

Greenberg, "Collaborative Interfaces for the Web," in Human Factors and Web Development, (Forsythe et al., eds.) Chapter 18, pp. 241-253, LEA Press, (1997).

Gutwin, "Workspace Awareness in Real-Time Distributed Groupware," The University of Calgary, Department of Computer Science, Ph.D. Thesis, 270 pages (Dec. 1997).

Handley et al., "SIP: Session Initiation Protocol," Network Working Group, Request for Comments 2543, pp. 1-153 (Mar. 1999).

Hong et al., "Dynamic Group Support in LANMAR Routing Ad Hoc Networks," IEEE, pp. 304-308 (2002).

Hoschek, Wolfgang, "A Unified Peer-to-Peer Database Framework for Scalable Service and Resource Discovery", M. Parasher (Ed.), GRIG 2002, LNCS 2536, pp. 126-144 (2002).

Huitema, C., Distributed Peer-to-Peer Name Resolution, Presentation Slides from the O'Reilly Peer-to-Peer and Web Services Conference, Nov. 5, 2001.

Joa-Ng, M. et al., "A GPS-based Peer-to-Peer Hierarchical Link State Routing for Mobile Ad Hoc Networks", IEEE 51$^{st}$ Vehicular Technology Conference Proceedings, vol. 3, pp. 1752-1756 (2000).

Joa-Ng, M. et al., "A Peer-to-Peer Zone-Based Two-Level Link State Routing for Mobile Ad Hoc Networks", IEEE Journal on Selected Areas in Communications, vol. 17, No. 8, pp. 1415-1425 (Aug. 1999).

Kollock et al., "Managing the Virtual Commons: Cooperation and Conflict in Computer Communities," in Computer-Mediated Communication: Llinguistic, Social, and Cross-Cultural Perspectives, (Herring, ed.), pp. 109-128 (John Benjamins, Amsterdam, Netherlands, 1996) http://research.microsoft.com/scg/papers/KollockCommons.htm.

Kollock, "The Economies of Online Cooperation: Gifts and Public Goods in Cyberspace," in Communities in Cyberspace, (Smith et al, eds.), pp. 1-17 (Routledge, London, UK, 1999) http://www.sscnet.ucla.edu/soc/faculty/kollock/papers/economies.htm.

Kwon et al., "An Efficient Peer-to-Peer File Sharing Exploiting Hierarchy and Asymmetry", IEEE, pp. 226-233 (2003).

Labovitz et al., "Internet Routing Instability", SIGCOMM '97, ACM, pp. 115-126 (1997).

Lee et al., "Supporting Multi-User, Multi-Applet Workspaces in CBE," in Proceedings of the ACM 1996 Conference on Computer Supported Cooperative Work, pp. 344-353 (Cambridge, MA, 1996.

Legedza et al., "Using Network-level Support to Improve Cache Routing", Hamilton et al., (Ed.), Computer Networks and ISDN Systems: The International Journal of Computer and Telecommunications Networking, vol. 30, No. 22-23, pp. 2193-2201 (1998).

MeetingMarker—Meeting Maker printout, 2 pages printed on Jul. 1, 2005 from http://www.meetingmaker.com/products/meetingmaker/default.cfm.

MeetingMarker—WebEvent Publish printout, 2 pages printed on Jul. 1, 2005 from http://www.meetingmaker.com/products/webevent_publish/default.cfm.

Microsoft Corporation; "Introduction to Windows Peer-to-Peer Networking," Published: Jan. 2003.

Microsoft.com, "Peer-to-Per Common Documentation," http://msdn.microsoft.com/library/default.asp?url=/library/en-us/p2psdk/p2p/peer_to_common_documentation.asp, (last visited Aug. 5, 2005).

Morris, J.; Data Structures and Algorithms—Sections 8.3; Online Publication 1998; http://clips.ee.uwa.edu.au/{morris/Year2/PLDS210/hash_tables.html.>: Aug. 8, 2005.

Newmarch, J., "JXTA Overview," Oct. 7, 2002, retrieved from http://jan.netcomp.monash.edu.au/distjava/jxta.html on Jun. 2, 2005 (pp. 1-15).

Oram, A.,; Peer-to-Peer: Harnessing the Benefits of a Distruptive Technology Passage; Peer-to-Peer: Harnessing the Benefits of a Disruptive Technolgoy; Mar. 15, 2001; pp. 94-122.

Partial European Search Report; EP 02 00 5770; Mar. 27, 2005.

Portmann et al., "The Cost of Peer Discovery and Searching in the Gnutella Peer-to-peer File Sharing Protocol", Proceedings Ninth IEEE International Conference on Networks, pp. 263-268 (2001).

Portmann, M., et al., "The Cost of Application-level Broadcast in a Fully Decentralized Peer-to-peer Network", Proceedings ISCC 2002 Seventh International Symposium, pp. 941-946 (2002).

QuickTime Broadcaster (3 pages) printed Jul. 1, 2005 from http://www.apple.com/quicktime/broadcaster/.

Ratnasamy et al., "A Scalable Content-Addressable Network", SIGCOMM '01, ACM, pp. 161-172 (2001).

Reynolds, J., "BOOTP Vendor Information Extensions," Network Working Group, http://www.faqs.org/rfc/rfc1395.txt, retrieved Dec. 23, 2005, Jan. 1993.

Saroiu et al., "A Measurement Study of Peer-to-Peer File Sharing Systems", Technical Report #UW-CSE-01-06-02, Department of Computer Science & Engineering, University of Washington, Seattle, Washington, 14 pages (2001).

Schmidt et al., "A Generic System for Web-Based Group Interaction," in Proceedigns of the Thirty-First Hawaii International Conference on System Sciences, vol. I, pp. 545-554 (Kohala Coast, HI, Jan. 6-9, 1998).

Sedgewick R.; Algorithms in C—Third Edition—Part of Chapter XVI; Algorithms in C—Third Edition, 1998; pp. 662-691.

Sedgewick, R.; Algorithms in C—Third Edition—Chapter XIV; Algorithms in C++; 1998; pp. 573-608; Section 14.4.

SlidesNow! (3 pages) printed Jul. 1, 2005 from http://www.slidesnow.com/about.shtml.

Smith et al., "The Social Life of Small Graphical Chat Spaces," in Proceedings of the SIGCHI Conference on Human Factors in Computing Systems, pp. 462-469 (The Hague, Netherlands, Mar. 2000) http://research.microsoft.com/scg/papers/vchatchi2000.pdf.

Smith et al., "What Do People Do in Virtual Worlds? An Analysis of V-Chat Log File Data," Microsoft Corporation Report (Apr. 1, 1998) http://research.microsoft.com/scg/papers/kollockvpchat.pdf.

Stoica et al., A Scalable Peer-to-Peer Lookup Service for Internet Applications; MIT Technical Report; Mar. 23, 2001; http://www.Ics.mit.edu/publications/pubs/ps/MIT-LCS-TR-819.ps>.

Sunaga et al., "Advanced Peer-to-Peer Network Platform for Various Services-SIONet (Semantic Information Oriented Network)", Proceedings of the Second International Conference on Peer-to-Peer Computing, IEEE, pp. 169-170 (2002).

Tanenbaum, Andrew S., "Computer Networks," Third Edition, Prentice Hall PTR, 1996; pp. 437-449.

The Best Way to Centrally Deploy Applications and Provide On-Demand Access, 2 pages printed Jul. 1, 2005 from http://www.citrix.com/English/ps2/products/product.asp?contentID=186.

Traversat et al., "Project JXTA Virtual Network," Sun Microsystems, Inc. Oct. 28, 2002 (pp. 1-10).

Tyson, "How the Old Napster Worked," http://computer.howstuffworks.com/napster.htm/printable.

Xiao et al., "On Reliable and Scalable Peer-to-Peer Web Document Sharing", Proceedings of the International Parallel and Distributed Processing Symposium, IEEE, pp. 23-30 (2002).

Zhang et al., "gMeasure: A Group-based Network Performance Measurement Service for Peer-to-Peer Applications", IEEE Globecom 2002, 5 pgs (2002).

Zhao, et al., "A Web Based Multi-Display Presentation System," 2 pages printed Jul. 1, 2005 from http://www.fxpal.com/publications/FXPAL-PR-04-303.pdf.

Zhao et al., "Tapestry: An Infrastructure for Fault-tolerant Wide-area Location and Routing", Report No. UCB/CSD-01-1141, Computer Science Division (EECS), University of California, Berkeley, California, 27 pgs (2001).

* cited by examiner

PEER-TO-PEER GROUPING INTERFACES AND METHODS

FIELD OF THE INVENTION

The present invention relates generally to group and group data record management in a peer-to-peer infrastructure, and more particularly to application programming interfaces and methods for the creation and maintenance of peer-to-peer groups, and management of records (data) and group member node communication in a peer-to-peer group.

BACKGROUND OF THE INVENTION

Group communication technologies on the Internet allow users with common interest to collaborate, share files, chat with one another, multi-cast audio and video for presentations and group meetings, and engage in multi-player gaming. Indeed, the ability for group formation in an ad hoc basis present significant advantages to allow users with common interests to gather in a virtual area or group that may be segregated from the general Internet population thereby facilitating useful discussion in collaboration between such like minded individuals. Currently, however, most group communication and formation takes place in a server centric environment whereby all communication flows to or through large central servers to which individuals may connect to join and participate in the group.

With the reemergence of peer-to-peer technology, the current server centric model of Internet communication is quickly being replaced. Indeed, peer-to-peer technologies enable users to contact one another in a serverless environment, free from the constraints of server based Internet communication. In a peer-to-peer based system, a users anonymity and privacy may be maintained since communication occurs directly between peers within the network. However, while individual communication and file sharing is relatively well established in peer-to-peer networks, establishing, discovering, joining, maintaining, and sharing information in a group peer-to-peer environment is not well established. However, individuals have grown accustomed to the benefits provided by such grouping technology in the server centric environment. Therefore, a need exists for technology that allows both the benefits of peer-to-peer technologies and grouping technologies to be realized in the serverless environment that is peer-to-peer.

As with a server centric environment, groups may be entirely open to allow Internet file searching and sharing within groups. Network location based groups that are typically groups of computers sharing the same access point in a conference room or groups of computers behind a firewall are another type of group known in the server centric world. Additionally, password defined groups allowing for private communication/collaboration within the group, such as secure conference room groups, in home networking groups are also known. External groups, such as NT domain based groups and groups of passport users also exists. Finally, voting based groups that are governed by peer reputation based systems where members are voted in and out are also known. Therefore, the existence of similar groups within the peer-to-peer serverless environment are also desired.

However, because peer-to-peer networks are formed as a graph of distributed users or peers, it is necessary that group communication be passed to one peer to another before all peers within a network may become cognizant of the shared information. Systems that provide such routing include Usenet and OSPF. However, such current systems suffer from limitations that have, to date, limited the full development of group peer-to-peer technology. Additionally, peer-to-peer networks currently suffer from a lack of adequate graph management that, at times allows the graphs to "break" or become split when one of the members leaves the group. In such an instance, information from one half of the group may no longer be passed to peer members on the other side of the partition created by the departure of one of the peers. As a further disadvantage, no adequate mechanism exists for the detection of such partition.

There exists, therefore, a need in the art for peer-to-peer group and record management interfaces that addresses the above-described and other problems existing in the art.

BRIEF SUMMARY OF THE INVENTION

The inventive concepts disclosed in this application involve a new and improved system and method for group management in a peer-to-peer (P2P) network. More specifically, the present invention is directed to a new and improved P2P application programming interfaces (APIs) and methods for the creation and access of groups, the retrieval of group member node and group information, the addition, modification, deletion and management of records (data), the importation and exportation of group data, the direct communication between group member nodes, the addition of a security layer to ensure that only those with permissions can view and use the data stored in the group, the setting and retrieval of presence information, the registering for event notifications, and other utility and support functions. A group imposes a particular policy, invitation mechanism, and rights and roles on a graph to govern use of the group data.

In one embodiment of the present invention, an API and method are exposed to the application writers in order to establish peer-to-peer groups and to efficiently and reliably pass data between its members. The grouping infrastructure ensures that each member has a consistent view of the data in the group. The core piece of the grouping technology is the group member node (hereinafter "member"). A member represents a particular instance of an individual on the network who is a member of the group. Members are able to connect to each other to form, expand, contract, etc. a group. The members are able to send data between each other in the form of records.

Group records are essentially pieces of data flooded (sent) to all members in a group. Once a group record (hereinafter "record") has been received by a member, the member places the record in a group database or data store. Grouping is responsible for ensuring each member's group database has the exact same view of the data in the group. It keeps each member synchronized. As members connect and disconnect from groups, partitions or "splits" in the group may occur. Grouping is also responsible for detecting and repairing these partitions. If they desire to do so, members in the group can create connections separate from the traditional group connections. These group direct connections allow members to send arbitrary data to each other individually. Finally, grouping has an eventing infrastructure that allows applications to register and receive event notifications. Event notifications are the mechanism grouping uses to alert applications to the fact that something has changed within the group.

In one embodiment of the present invention, application programming interfaces (APIs) are provided that provide group creation and access management. These APIs create a new group, allow a peer to join a group, open an existing group for connection, connect to a group, close a group, delete a group, create a group invitation, and parse a group invitation. Each of these interfaces utilize various parameters that are passed in from an application program that uses these interfaces to manage and utilize groups. The interfaces return a value that indicates the success or failure of the function. For failures, the interfaces provide an indication as to the problem resulting in the failure.

In another embodiment of the present invention, application programming interfaces (APIs) are provided that provide the retrieval and management of group and member information. These APIs get group status, get group properties, set group properties, enumerate the group members, and authorizes the credential renewal of members. Each of these interfaces utilize various parameters that are passed in from an application program that uses these interfaces to manage and utilize groups. The interfaces return a value that indicates the success or failure of the function. For failures, the interfaces provide an indication as to the problem resulting in the failure.

In a further embodiment of the present invention, application programming interfaces (APIs) are provided that provide record management. These APIs add records, update records, delete records, retrieve records, enumerate records, and search for records. Each of these interfaces utilize various parameters that are passed in from an application program that uses these interfaces to manage and utilize groups. The interfaces return a value that indicates the success or failure of the function. For failures, the interfaces provide an indication as to the problem resulting in the failure.

In a still further embodiment of the present invention, application programming interfaces (APIs) are provided that allow a member to export its group database and import a group database from another member. Each of these interfaces utilize various parameters that are passed in from an application program that uses these interfaces to manage and utilize groups. The interfaces return a value that indicates the success or failure of the function. For failures, the interfaces provide an indication as to the problem resulting in the failure.

In yet a further embodiment of the present invention, application programming interfaces (APIs) are provided that provide utility and support functions. These APIs retrieve the next item in an enumeration, end an enumeration, get an item count, and free data retrieved by other APIs. Each of these interfaces utilize various parameters that are passed in from an application program that uses these interfaces to manage and utilize groups. The interfaces return a value that indicates the success or failure of the function. For failures, the interfaces provide an indication as to the problem resulting in the failure.

In a still further embodiment of the present invention, application programming interfaces (APIs) are provided that allow for direct communication between members of a group. These APIs open direct communications, close direct communications, send data, and enumerate connections to the member. Each of these interfaces utilize various parameters that are passed in from an application program that uses these interfaces to manage and utilize groups. The interfaces return a value that indicates the success or failure of the function. For failures, the interfaces provide an indication as to the problem resulting in the failure.

In a further embodiment of the present invention, application programming interfaces (APIs) are provided that provide an events infrastructure. These APIs register for event notifications, un-register events, and retrieve event data. Each of these interfaces utilize various parameters that are passed in from an application program that uses these interfaces to manage and utilize groups. The interfaces return a value that indicates the success or failure of the function. For failures, the interfaces provide an indication as to the problem resulting in the failure.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
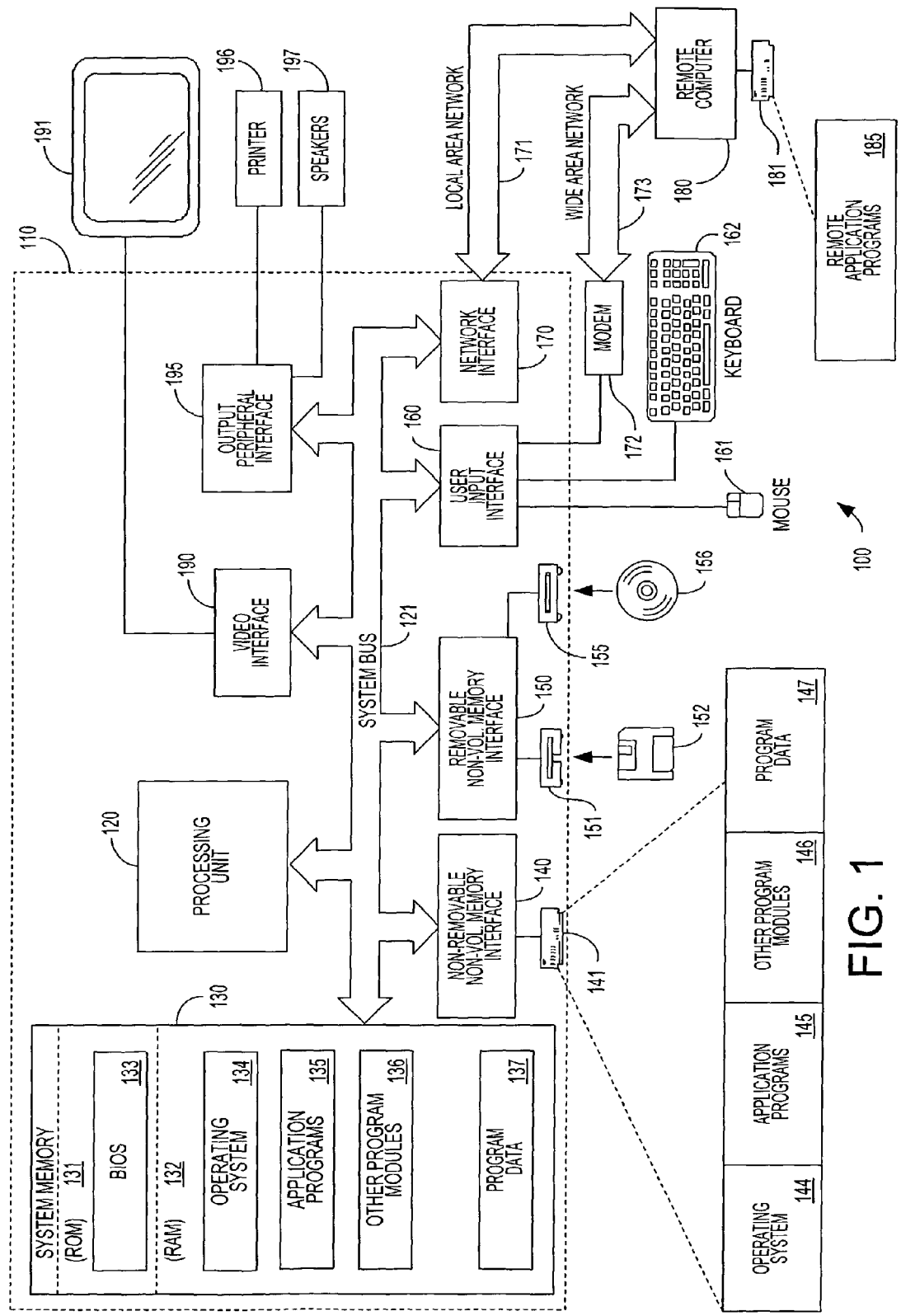
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network member, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As introduced above, the success of a peer-to-peer (P2P) protocol depends on the protocol's ability to establish valid connections between selected entities. Likewise, the formation of groups in such a P2P network relies on this ability. Because a particular user may connect to the network in various ways at various locations having different addresses, a preferred approach is to assign a unique identity to the user or the group, and then resolve that identity to a particular address or addresses through the protocol. Such a peer-to-peer name resolution protocol (PNRP) to which the grouping system and method of the instant invention finds particular applicability, although by which the present invention is not limited, is described in co-pending application Ser. No. 09/942,164, entitled Peer-To-Peer Name Resolution Protocol (PNRP) And Multilevel Cache For Use Therewith, filed on Aug. 29, 2001, in co-pending application Ser. No. 10/122,863, entitled Multi-Level Cache Architecture and Cache Management Method for Peer-To-Peer Name Resolution Protocol, filed Apr. 15, 2002, and in co-pending application Ser. No. 09/955,923, entitled Peer-To-Peer Group Management and Method For Maintaining Peer-To-Peer Graphs, filed on Sep. 19, 2001, the teachings and disclosure of which are hereby incorporated in their entireties by reference thereto.

However, one skilled in the art will recognize from the following teachings that the P2P grouping interfaces and methods of the present invention are not limited to the particular peer-to-peer protocol of these co-pending applications, but may be applied to other resolution and grouping protocols with equal force. Likewise, co-pending application Ser. No. 09/956,260, entitled Peer-To-Peer Name Resolution Protocol (PNRP) Security Infrastructure And Method, filed on Sep. 19, 2001 describes an underlying security infrastructure that ensures that the identities of the various entities within the network are valid, without unnecessary burdening the network with excess traffic. In the P2P grouping environment, co-pending application Ser. No. 09/955,924, entitled Peer-To-Peer Name Resolution Protocol (PNRP) Group Security Infrastructure and Method, filed on Sep. 19, 2001, describes the underlying security infrastructure used for such groups. The teachings and disclosure of these applications are also incorporated in their entireties by reference thereto. However, while the interfaces and methods of the present invention find particular applicability to and interaction with such PNRP, one skilled in the art will recognize that the present invention is not limited thereby, but has applicability to any P2P system or protocol that desires to provide grouping functions.

As discussed in the above-incorporated co-pending application describing the PNRP and to provide some useful background, establishing peering relations between individual peers is an expensive process in existing peer-to-peer networks. In the PNRP, however, each member accumulates a routing table that contains a list of references to other members in the network. For each member entry, address information, which may include a member identification, address, the key of the member, and the distance between the key of this member and the key of the local member are obtained. Each time the local member learns about a remote member, it checks whether the member is already known, and if not whether to enter an entry in the routing table. Each entry has an 'ideal cache level' determined by its 'distance' from the cache owner. New entries may only be added to the cache level corresponding to their distance, or to the lowest level if the entry's 'ideal cache level' has not been breached yet.

For communication between individual peers in PNRP, when a member receives a query it searches for the entry in its routing table whose key best matches the target, excluding the members that have already been visited. The query is then forwarded directly to the member that advertised the entry. If there is no adequate entry, the request is sent back to the member from which the request was received; this member will try another entry in its own routing table. The request is successful if it reaches the entry whose key matches the target. It is unsuccessful if the target is not reached in the maximum number of steps, or if the member from which the request was received tries all possible neighbors and receives a negative response. In the case of successful requests, the response is relayed by all intermediate hops. It carries the address of the member that held the target key, and this entry can be inserted in the routing tables of the intermediate members.

As with many successful P2P protocols, entities (both individual peers as well as groups) can be published for easy discovery. To provide security and integrity to the P2P protocol, however, each identity preferably includes an attached identity certificate. The keeper of the ID's private key uses the certificate to attach additional information to the ID, such as the friendly name, etc. Preferably, each member generates its own pair of private-public keys, although such may be provided by a trusted supplier. The public key is then included as part of the member identifier. Likewise, a group creator generates group public and private keys. Only the member that created the pair of keys has the private key with which it can prove that it is the creator of the identity. In this way, identity theft may be discovered, and is, therefore, deterred.

As also discussed in this above-identified application, peer identification certificates provide integrity and validity to a peer's identity in the P2P network. These ID certificates are of the form [Version, ID, <ID Related Info>, Validity, Algorithms, $P_{Issuer}$]$K_{Issuer}$. As used in this certificate representation, Version is the certificate version, ID is the peer name to be published, <ID Related Info> represents information to be associated with the ID, Validity represents the period of validity expressed in a pair of From-To dates expressed as Universal Date Time (also know as Greenwich Mean Time (GMT)), Algorithms refers to the algorithms used for generating the key pairs, and for signing, and $P_{Issuer}$ is the public key of the certificate issuer. If the certificate issuer is the same as the ID owner then this can be left blank. In such a case it is assumed that $P_{Issuer}=P_{ID}$. The term $K_{Issuer}$ is the private key pair of $P_{Issuer}$. If the certificate issuer is the ID owner then this is $K_{ID}$, the private key of the ID owner.

In the P2P group context, a group membership certificate of similar structure wherein the <ID Related Info> comprises the Peer name that is certified as the member of the group, and a certificate Serial Number. Such a group membership certificate is of the structure [Version, ID, Peer ID, Serial Number, Validity, Algorithms, $P_{ID}$, $P_{Issuer}$]$K_{Issuer}$. As used therein, ID is the Group ID, Peer ID is the Peer name that is certified as a member of the group, Serial Number is the certificate serial number per issuer. PNRP allows every issuer to keep its own numbering scheme. Preferably, certificate serial numbers are globally unique (GUID, unless the computer does not have a network card. The Validity refers to the period of validity expressed in a pair of From-To dates, $P_{ID}$ is the public key from which the ID was derived, and $P_{Issuer}$ is the public key of the certificate issuer. If the certificate issuer is the same as the ID owner then this field can be left blank and it will be assumed that $P_{Issuer}=P_{ID}$. $K_{Issuer}$ is the private key pair of $P_{Issuer}$. If the certificate issuer is the ID owner then this is $K_{ID}$, the private key pair of the ID owner.

This group membership certificate may be used to verify that the specified Peer ID is a member of the group with the specified group ID. This information is signed with the private key of the issuer $K_{Issuer}$. Depending on the group security policy selected, any group member or only a smaller set called group owners can be certificate issuers. In all cases, however, to verify that the issuer is certified to issue such certificates a chain of group membership certificates has to exist that leads to a certificate signed with the group private key.

Figure 2:
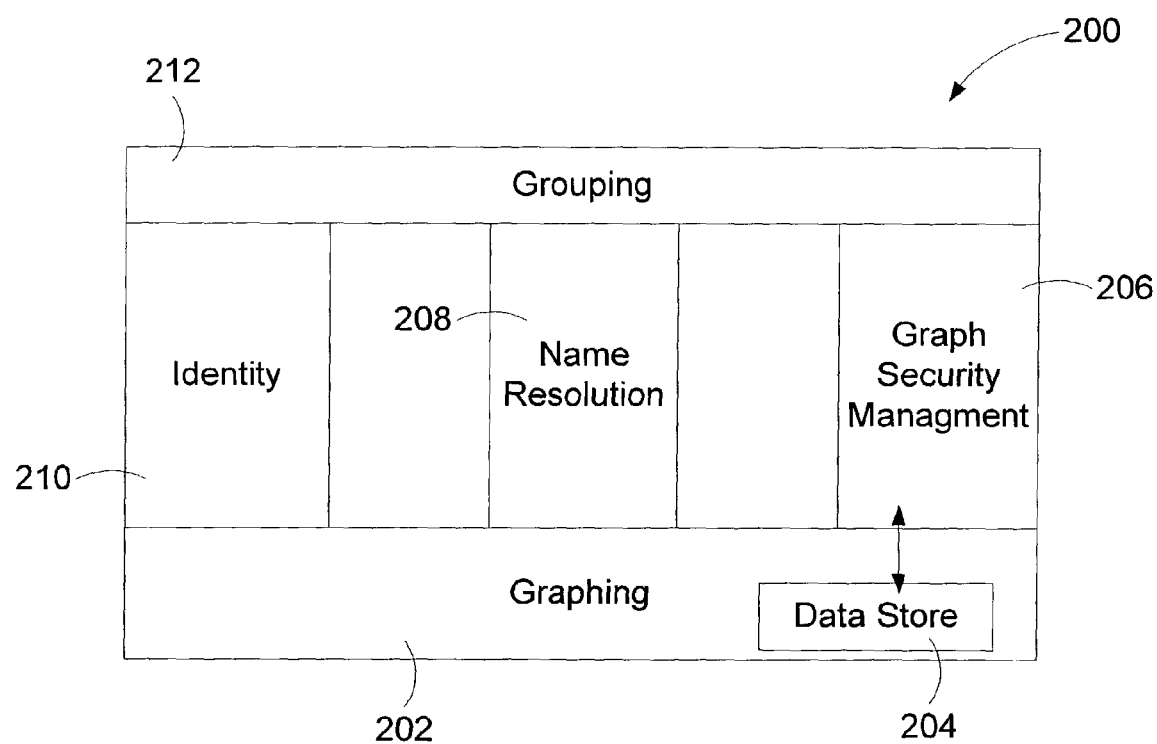
FIG. 2 is a simplified framework diagram illustrating a peer-to-peer (P2P) interface framework into which the system and methods of the present invention find particular applicability.

Having now provided one P2P environment to which the grouping system and methods of the present invention finds particular applicability, attention is now directed to FIG. 2. This FIG. 2 illustrates an exemplary P2P framework 200 in which the present invention may exist, although it is not limited for use with only such frameworks. Indeed, the grouping system and methods of the present invention may be used with various frameworks which need or desire a coordinated, logical set of interfaces that allow complete management of P2P groups. Of course one skilled in the art will recognize that various application programs can utilize the APIs of the present invention to provide a rich user interface and a set of functions that allow management of the various groups that may be desired in the P2P environment.

As illustrated in this FIG. 2, the underlying P2P graphing interfaces 202 utilize a data store 204 that contains all of the information needed in the P2P framework 200. A description of one embodiment of these graphing interfaces 202 is contained in co-pending application Ser. No. 10/309,865, entitled Peer-To-Peer Graphing Interfaces and Methods, filed on Dec. 4, 2002, the teaching and disclosure of which are hereby incorporated in their entireties by reference thereto. The information in the data store is also utilized by a P2P graph security management interface 206 that provides the security necessary for productive participation in a P2P graph. Some form of P2P name-to-address resolution 208 must also typically be provided to allow the P2P system to function. As discussed above, one such system is the PNRP system described in the above identified co-pending applications.

The identity interfaces 210 of the present invention are also included in this framework 200. A description of one embodiment of these identity management interfaces 202 is contained in co-pending application Ser. No. 10/309,864, entitled Peer-To-Peer Identity Management Interfaces And Methods, filed on Dec. 4, 2002, the teachings and disclosure of which are hereby incorporated in their entireties by reference thereto. Finally in this exemplary framework 200, a set of grouping interfaces 212 are provided to allow proper participation in P2P groups.

Turning now specifically to the grouping management interfaces 212 provided by the system and methods of the present invention, this group of APIs is exposed to the application writers in order to establish peer-to-peer groups and to securely, efficiently, and reliably pass data between members. The grouping infrastructure 212 ensures that only peers invited to the group can join and connect throughout the lifetime of the group. The peer-to-peer grouping APIs have interfaces for creating groups, finding other members of a group, securely adding records to groups, and securely sending data to group members. It allows developers to utilize the peer-to-peer grouping infrastructure with ease.

Grouping is the convergence point of all the major peer networking technologies. It combines the power of a name resolution protocol (e.g. PNRP), the robustness of the graphing infrastructure 202, and adds a security layer to graphing to ensure only those with permissions can view and use the data stored in the group. A group imposes a particular policy, invitation mechanism, and rights and roles on a graph to govern use of data. If they desire to do so, members in the group can create separate connections from the traditional group member connections. These direct connections allow members to send secure arbitrary data (records) to each other.

Records are essentially pieces of data flooded (sent) to all members in a group, or to only select members through the direct connection mechanism. Once a record has been received by a member, the member places the record in a database or data store. Grouping is responsible for ensuring each member's database has the exact same view of the data. It keeps each member synchronized. As members connect and disconnect from groups, partitions or "splits" in the group may occur. Grouping is also responsible for detecting and repairing these partitions Finally, grouping has an eventing infrastructure that allows applications to register and receive event notifications. Event notifications are the mechanism grouping uses to alert applications to the fact that something has changed within the group.

Upon initial desire of a user to establish a peer group, an application program calls the initialization and cleanup functionality of the APIs of the present invention. These APIs are responsible for the start-up and shut down of the grouping infrastructure 212. The grouping start-up routine allows applications to specify the exact version of the infrastructure it wishes to use. Before P2P grouping can be used, the application must call the peer group startup function to tell the grouping infrastructure 212 what version it would like to utilize. The grouping infrastructure 212 then responds with the version requested, and the highest version it supports. The final API that must be called is peer group shutdown function API. This tells the grouping infrastructure 212 that the application has finished using the infrastructure. In one embodiment of the present invention, each call to the peer group startup function must be matched by a call to peer group shutdown function.

These functions utilize a peer version data structure that contains the version information about the P2P grouping infrastructure. The parameters of this structure are the version of the P2P protocols that the installed P2P dynamic link library (dll) expects the caller to use, and the highest version of the P2P protocols that the installed P2P dll can support. Usually, these are the same.

To initiate start up, the application calls the peer group startup function first before any other functions are called. The parameter passed into this function is the version requested. This is the highest version of the peer-to-peer protocols that the caller can use. Preferably this parameter is a word with the high order-byte specifying the minor version (revision), the low-order byte specifying the major version number. The output parameter for this function is a pointer to the peer version data structure (discussed above) that specifies the version of the P2P APIs and that receives details of the support provided by the P2P dll installed on the system. The return values for this function indicate the success or failure of the operation. The error messages will indicate the type or reason for failure. They include errors as a result of insufficient memory to complete the requested function, errors resulting from the specification of an unsupported version, i.e. the version requested is not supported by the P2P subsystem installed on the local machine.

To initiate shut down, the application calls the peer group shutdown function. This function cleans up any resources allocated by the call to the API peer group startup. As indicated above, there is preferably one call to peer group shutdown for each call to peer group startup. There are no required parameters for this function. This function returns an indication of success or failure of the shutdown function. In the case of error, the function returns an appropriate error code.

After calling the peer group startup function, the next task an application has to do is to setup a group for use. It does this by calling either the peer group create function or the peer group open function. If the application would like to create a brand new group, it needs to get an identity specifying what identity should be used to create the group. The identity functions as the owner of the group and the only member initially if a new group is being created. The application now has a first chance to sign up for event notifications. The next call in the flow is to the peer group connect API.

The second way an application can set up a group for use is to open an existing group. The peer group open function can be called to open a group that a member has already created or joined. After a group has been opened, an application has access to the database and can sign up for notifications. Multiple applications can open a group. An application can choose to open a group and not call the peer group connect function. In such a case, this application is considered offline. However, a second application could start and call the connect function to connect the peer to the group. Therefore, an application must be ready to go online (connect) at any time. After a call to open, the application has an opportunity to sign up for events. The next call in the flow is the peer group connect API.

Once a member has created or opened a group, it receives a group handle. This handle is used in most of the following grouping APIs of the present invention. When a member wishes to disconnect from the group, all it need do is call the peer group close function to close the group.

In the foregoing description of the group startup and shutdown process, the application was required to specify the peer group properties. This is done through the peer group properties data structure, which holds data about group policy and other information. The information included in this data structure includes a specification of the size, in bytes, of this data structure. This data structure also includes flags pertaining to the behavior of the group, as will be described more fully below. A string representing the name of the cloud is also included. The data structure also includes a classification of the group in the cloud, the peer name of the group registered with the name resolution protocol, the peer name of the creator of the group, and the friendly name of the group. A comment field used to describe the group in friendly terms (e.g. Mort's group for RAD developers) is also provided. This data structure also includes timing information. This information includes the default lifetime (e.g. in seconds) of a group member's group membership certificate (GMC), the maximum lifetime of a member's GMC, the lifetime of a member's data, the lifetime of presence information published in the group, the time before an online renewal is requested for an expiring GMC, the time before an offline renewal is requested for an expiring GMC, and the lifetime of an offline renewal request.

The peer group behavior flags introduced above include a disallow online renewal flag that indicates whether or not online renewal is permitted in the group, and a disallow offline renewal flag that indicates whether or not offline renewal is permitted in the group. A group member data optional flag indicates whether or not member data is optional. A group renewal authorization mandatory flag indicates whether or not it is mandatory that a membership renewal must be authorized. Another flag indicates whether or not the group allows the publication of record types that are not defined. Additionally, a flag may be included that indicates whether or not the peer presence system is disabled.

In order to join a group, a group invitation is needed. The information contained in the invitation is stored in a peer invitation information data structure. This structure contains an indication of the structure size, any flags that may be set in the invitation, and the cloud name of the cloud for the group. Further, this data structure includes the file time that is the start time of the validity period of this invitation, and the file time that is the end time of the validity period of this invitation. The invitation data structure also includes a pointer to the membership information of the invitee.

A peer data data structure is also included. This data structure is a binary byte container that includes the size, e.g. in bytes, of the data pointed to by a pointer to the data buffer, an the pointer to the data buffer containing the peer data.

Having now provided a description of the creation and management of peer groups and the data structures used therein, attention will now turn to the details of the specific interfaces required to accomplish the functions discussed above.

As discussed above, a call to the peer group create interface creates an entirely new group. It also provides the opportunity to specify information pertaining to the group. This call results in a group handle being allocated. After calling this function, an application has the opportunity to subscribe to events before it calls the peer group connect function. These event APIs are the only APIs that can be called successfully if the application is not connected to the group. The parameters for this peer group create interface include all of the properties of a group. The output of this API is set to the handle for the group that was created. This peer group create API returns an indication of success or failure. If failure, the API returns an indication of the type of failure, e.g. invalid parameter, out of memory, or if a group with the particular P2P ID already exists and the peer is trying to create a new group.

The peer group join API is called when an existing group is being joined for the first time. When a peer node intends to join a group, it calls this function after receiving an invitation from a member of the group. The next call in the flow is to the peer group connect API. After this call is the first chance for event notifications. The parameters of the peer group join API are the identity being used to join the group, the invitation given to the peer so that it can join the group, and optionally the cloud in which to find the group that the peer wishes to join. If not specified, the cloud identified in the invitation is used. This API returns the handle to the group to be joined. The API also returns an indication of success or failure. If failure, the reason for such failure is provided, e.g. an invalid parameter, out of memory, invalid handle supplied, or an indication that no member of the group was found to process the join.

The peer group open API discussed above opens a group that has been created previously or that has been joined previously. This call results in a group handle being allocated, but not the establishment of network connections. As with the preceding API, after calling this API the application has the opportunity to register for events and has access to the group database. Multiple applications can open a group. The parameters for this peer group open API include the identity being used to open the group. This identity must have a GMC for that group. The peer name of the group being opened must also be specified. However, the cloud in which to advertise the group that is being opened is optional. If not specified, the cloud previously connected to is used. If that cloud is not available, the cloud specified in the original invitation is used. This API returns an indication of success or failure of the function. These error indications include an indication of an error due to an invalid argument and an indication of an error because an invalid handle.

When a member desires to make a connection to the group, it calls the peer group connect API. This call initiates a search (e.g. through PNRP) for the group and attempts to create a connection to the group. After this function is called, a member of the group is able to receive connection requests from other members. The parameter for this API is the handle of the group. This API returns an indication of success or failure. The error indications include an indication of an error due to an invalid argument.

The peer group close API invalidates the group handle obtained by the call to the peer group create API, the peer group join API, or to the peer group open API. If the group handle being closed is the last one that refers to a group being shared across multiple applications/processes, the call will also close all network connections and invalidate contact records for the member. The parameter for this API is the handle of the group from which to disconnect. This API returns an indication of success or failure. These error indications include an indication of an error due to an invalid argument, and an indication of an error because the handle supplied is invalid.

While the peer group close API allows a member to disconnect from a group, it does not delete that group. To perform such a deletion of the data of an associated group, an application would need to call the peer group delete API. This function deletes the data and group certificates associated with a group. If a group is deleted, all open handles associated with that group become invalid. The parameters for this API include the identity from which to delete the group, and the peer name of the group to delete from the identity and the peer name of the group to delete data from. This API returns an indication of success or failure. These error indications include an indication of an error due to an invalid argument, an indication of an error because the handle supplied is invalid, and an indication of error due to a denial of access to perform the requested function.

In order to join a group, an application must have a group invitation. A call to the peer group create invitation API retrieves a signed invitation that can be used by another member when it wants to join the group. For obvious security reasons, members cannot create invitations for roles within the group that are superior to their own role (e.g. a guest cannot create an invitation for an administrator). The parameters for the group create invitation API include the handle to the group for which the invitation pertains. The identify information of the peer being invited is also required, as is the count of roles assigned to the individual. This function also requires a pointer to the role information being assigned to the invited individual and the point in time that the invitation will expire. This function provides a pointer to the invitation. The API provides an indication of success or failure. The error indications include an indication of failure due to an invalid parameter, a lack of memory, buffer to small, an error denoting that the role requested is higher than the role of the member creating the invitation, and an invalid handle.

To parse a group invitation, an application calls the peer group parse invitation function, which returns the structure representing the invitation. The parameter for this function is the handle to the group for which the invitation pertains. The function returns a pointer to a pointer of the invitation information structure. The API also provides an indication of success or failure. The error indications provide an indication of failure for lack of memory, an invalid argument, or if the invitation is not trusted.

In addition to the group formation and management functions provided by the system and methods of the present invention just discussed, the present invention provides application programming interfaces that allow an application to retrieve and manage group and member information. The structures used by these APIs include a peer address structure that contains details about address and port for a given node. In addition to the size of the structure, the peer neighbor's IPv6 address is also included in this structure. A peer member information structure is also provided that contains data about a group member. In addition to the size of the structure, a flag that describes the state of the member (e.g. indicating whether or not the peer is present in the group) may be included. The friendly name of the member is provided, along with the attributes that describe the member. The node ID of the member is also provided since there may be multiple member information structures with different node IDs. This structure also includes a count of addresses in the structure and a pointer to the IP addresses of the member. The structure includes the time at which this group member's credentials will expire. A count of the roles for the invitee and a pointer to the array of peer role IDs of the invitee are also included in this information structure.

These APIs also may use the peer membership information data structure. This structure contains information about the membership of that particular member. This is information about that member's credentials in the group, not about that member. The peer member data structure is the structure that contains information about the members themselves. The membership information data structure includes the size of the structure, and may include a reserved field for the setting of flags. The peer name of the group for which the invitation pertains is included, as is the peer name of the issuer of the invitation, and the peer name of the individual for whom the invitation is directed. The friendly name of the group for which the invitation pertains, the friendly name of the issuer of the invitation, and the friendly name of the individual for whom the invitation is directed. The structure also includes the file time indicating the start time of the validity period of the invitation and the file time indicating the end time of the validity period of the invitation. A count of the roles for the invitee and a pointer to the array of the peer role IDs of the invitee are included. A count of the classifiers associated with the group and a pointer to the array of classifiers associated with the group are also included in this structure. Finally, this structure includes a pointer to the public key of the subject of the group.

The present invention provides the ability to retrieve properties of the current group. An application can call the peer group get properties function, which retrieves the current group properties. The structure returned contains information about the current group properties. The parameters of this function are the handle of the group, and on success, a pointer to the group properties structure. This API returns an indication of success or failure. The error indications include an indication of an error due to an invalid argument, and an indication of an error due to insufficient buffer size.

The present invention also allows for the retrieval of the status of the group through a call to the peer group get status function. The parameters for this function are the handle to the group, and a set of peer group status flags that are currently set as the status of the group. These flags may be used to indicate whether or not the member is listening for connections, whether or not the member has connections to other members, and whether or not the member's database is synchronized.

In addition to retrieving information, the present invention also provides an interface that allows an application to set the group properties. The parameters of this function include a handle of the group, and pointer to the group properties structure. Preferably, this interface allows an application to modify the group properties, so long as the member has the right to change the properties. In one embodiment, only the group creator has the right to change properties. In another embodiment, members who are administrators also have this right. In still another embodiment, this right may be granted to any member by the creator or the administrators. This API returns an indication of success or failure. The error indications include an indication of an error due to an invalid argument, and an indication of an error due to a denial of access.

A member may receive an enumeration of the members in the group to be used with the enumeration support functions. This peer group enumerate members API returns an enumeration of the peer membership information structures discussed above for all instantiations of members in the group. The parameters for this function include the handle for the group, a flag to indicate whether or not the enumeration should only include members that are present, an optional member identity to identify a particular member for which the information should be retrieved. This function returns a handle to the enumeration. The function also returns an indication of success or failure. The error indications include an indication of an error due to an invalid argument, that the buffer passed in is too small, or due to an invalid handle.

The present invention also provides an API to authorize the credential renewal of a member whose membership information is expiring. The peer group authorize membership function renews that member's credentials into the group. An application knows when such event requires the calling of this function as it receives the peer group event membership authorization event notification. However, the member of the group that calls this API must have the right to renew the expiring credentials. Depending on the P2P system in which this API is used, such rights may attach only to the group creator, additionally to the group administrators, additionally to the member who invited the member whose credentials are expiring, etc. The parameters for this API are the group handle, a pointer to the membership information representing the credentials of the member that needs renewal, and a flag indicating whether or not to authorize the renewal of the member's credentials. This API returns an indication of success or failure based on a lack of authorization to perform the function.

Having now discussed the group initialization and cleanup functions, the group creation and access functions, and the group and member information functions of the present invention, attention is now turned to the record management functions of the present invention. Records are the method of communication between members in a group. Records are used to shape the group and ensure well-connectedness. A record comprises two parts: 1) the header, which contains information about the record including the version, creator and type; and 2) the content portion, which is the application defined data to be flooded throughout the group. This content portion also contains an XML structure that allows applications to add name-value attributes that describe the data. This field can be used to specify information for a search API to examine.

In accordance with an embodiment of the present invention, once a member is "connected" to a group, the member can manipulate the data communicated and stored in the group. The first thing an application must do is obtain a record. It can do this in one of two ways: 1) create a brand new record; or 2) utilize an access function. To create a brand new record the application begins by filling out a peer record with the needed information and data. Once it has done this, it calls the peer group add record function to add the record to the database. In addition to adding the record to the database, this function floods the record to the rest of the members in the group.

If, instead, the application decides to obtain an existing record, it can utilize an access function of the present invention. There are several such functions that applications can utilize to retrieve records from the database. The first is the peer group get record function. This API gets a specific record from a record Id (which is a GUID) specified by the application. The second is via an enumeration function, such as the peer group enumerate records API or the peer group search records API. The peer group enumerate records API returns an enumeration of records based on a record type or a member's identity. The peer group search records API accepts a search query that is used to filter records based on data in the attribute field. Each API returns an enumeration that can be used with the peer networking enumeration APIs (discussed below).

Once a record has been created or retrieved, an application can either update or delete the record. If an application wishes to update a record, it simply updates the fields it wishes and calls a peer group update record API. This API updates the record in the database and floods the record to each member in the group. Finally, a record can be deleted from the group by calling a peer group delete record API. It is important to note that this API does not actually remove the record from the database. Rather, it marks the record for deletion and floods this deletion to the rest of the group. The record is not removed from the database until it expires.

The record management structures that are used by the APIs of the present invention include the peer data structure. This record object that an application sees is defined by the peer data structure and includes as its parameters the size, in bytes, of data pointed to by a buffer pointer, and a pointer to the buffer containing data itself.

The peer record data structure includes as its parameters the size of the structure, which should be set to the size of the peer record header. The parameters also include the type of record, the ID of the record supplied by P2P infrastructure, and the record version supplied by the infrastructure when an application on calls to the peer group add record API or the update record API. This data structure may also include various flags indicating any special processing that should be applied to record. The unique identifier of the record creator (or group ID if record is being published on behalf of the group) is also included, as is an unique identifier of the last person to change the record. The data structure also includes a set of attribute-value pairs to be associated with record, specified as an XML string. Attributes are the place the search engine looks for data pertaining to the record. This is the place applications can put information about the contents of the record that will be found by the engine. In order for the engine to recognize and "find" attributes, this string must follow a search XML schema. If it does not, the search engine will not return results pertaining to this record. The UTC time that the record was created as supplied by the P2P infrastructure, the UTC time that the record will expire, and the UTC time that the record was last modified are also included in the structure. Security data for the peer data structure, which uses CRC checksum as a default, is also included. Finally, this data structure includes the actual record data.

The flags discussed above include a peer record flag called auto refresh. This flag is used to tell the grouping APIs used in the P2P system to automatically refresh this record when it is about to expire. The other peer record flag that may be set is called deleted. This flag indicates that the record is marked as deleted.

Having now provided a discussion of the record management APIs and data structures of the present invention, attention will now turn to the details of each of the individual record management APIs mentioned above. First, the peer group add record API is used to add a new record to the group as introduced above. A record added with this API is flooded to each member in the group. The parameters for this API include the group handle, a pointer to record data, and a pointer that is set to the record ID that uniquely identifies a record in a group. It is noted that only the size, type, and expiration are required in the record, while the data and attributes are optional. This API returns an indication of success or failure. The error indications include an indication of an error due to an invalid argument, and an indication of an error due to a denial of access. The denial of access error results when a peer tries to add a record type that it is not allowed to add.

The peer group update record API introduced above updates a record within the group. Further, this function updates the version number, and floods the record to each member in the group. The parameters for this function include the group handle, and a pointer to the new data to associate with the record. The fields in the record that can be modified are the size, the flags, the attributes, the expiration time (to a higher expiration time), the security data, and the data itself. This API returns an indication of success or failure. The error indications include an indication of an error due to an invalid argument, and an indication of an error due to a denial of access.

The peer group delete record API, as discussed above, marks a record as deleted within the group. This API does not actually remove the record from the database. Rather, it marks the record as deleted and floods it to the group. This is done to ensure that each member in the group has an identical view of the database. In one embodiment of the present invention, only the record creator can delete the record. The parameters for this API are the group handle, and a pointer to the record ID to delete. This API returns an indication of success or failure. The error indications include an indication of an error due to an invalid argument, and an indication of an error due to a denial of access. Deleting a record means marking the record as invalid by updating it with a peer RF invalid flag set in the record header and then letting the record expire. However, the actual record payload is preferably deleted.

The peer group get record API allows an application to retrieve a specific record via a record Id. The returned record should be freed by calling the peer group free data API. The parameters for this API are the group handle, a pointer to the record ID to retrieve, and a pointer that is set to a pointer to the retrieved record. This API returns an indication of success or failure. The error indications include an indication of an error due to an invalid argument, an indication that the record is not in the database, and an error due to a denial of access.

The peer group enumerate records API starts an iteration over all records of a specific type/and or creator. This is a snapshot of the records at a current time. The parameters for this API are the group handle, and a pointer to a type of record over which to iterate. If the pointer is NULL, the API will iterate over all records. The API also includes a parameter that identifies a peer ID. If specified, the API will iterate over only records created by that peer ID. If NULL, the API iterates over records created by all users. The API also generates a handle to the iteration. This API returns an indication of success or failure. The error indication includes an indication of an error due to an invalid argument.

The peer group search records API is used to search for specific records. The parameters of this API are the group handle, an XML string describing the query, and an enumeration handle. This API returns an indication of success or failure. The error indications include an indication of an error due to an invalid argument, an indication of an error due to a failure to initialize, and an indication of an error due to the lack of further records.

Having completed the description of record management APIs of the present invention, attention is now directed to the export and import APIs that form part of the grouping APIs of the present invention. An application can export the database to a specific file by calling the peer group export database API. It can only do this after the member has connected to the group at least one time and the application has called the peer group open API discussed above. An application can also import a database by calling the peer group import database API. It can only do this once it has a valid group handle.

The peer group export database API exports the group database into a file that can be moved to a different machine and imported there by calling the peer group import database API. The parameters of this API are a handle of the group, and a path to the file in which the exported data is to be stored. If that file already exists and contains any data, the data in it will be overwritten. This API returns an indication of success or failure. The error indication includes an indication of an error due to an invalid argument.

The peer group import database API imports a file representing the group database that is obtained by calling the peer import group database API. This API can only be called successfully if the user has not yet called the peer group connect API discussed above. The parameters for this API include a handle of the group, a path to the file to import, and a password to use to decrypt the database. This API returns an indication of success or failure. The error indication includes an indication of an error due to an invalid argument.

The grouping APIs of the present invention also include utility and support functions. There are two types of utility and support functions. The first is enumeration support and the second is memory support. The enumeration functions operate on any handle to a peer enumeration that the application has received. A handle to a peer enumeration can be obtained from functions such as the peer group enumerate records API and the peer group search records. Once an enumeration is obtained, the application can get the count of items in the enumeration by calling the peer group get item count API. To get items from the enumeration, the application must call the peer group get next item API. An application can specify the number of items it would like to receive from the enumeration. If an application requests more items than what is in the enumeration, the function will return the number of items in the enumeration. The memory support function is peer group free data function. If an application has received a piece of data from a grouping API, it must use this function to "free" the data. Additionally, the peer group get next item API returns data that must be freed using the API.

The peer group get next item API gets next items in an iteration started by a call to any API that returns a handle to a peer enumeration. Such APIs include the peer group enumerate records API, the peer group search records API, the peer group enumerate neighbors API, and the peer group enumerate presence API. All items returned should be freed using a single call to the peer group free data API. The application can request a range of records to be returned. The API will return equal or less than the number of records requested. The default number returned is one. The parameters for this API are the enumeration handle, the number of items to read (on return, contains the actual number of items read), and a pointer to the array of items. The actual data returned depends on the type of enumeration This API returns an indication of success or failure. The error indications include an indication of an error due to an invalid argument, if there are no more items, and if not initialized.

The peer group end enumeration API terminates and frees up any resources associated with an enumeration. An error indicating that there are no more items is returned if the enumeration does not contain any more items. The only parameter for this API is the handle to the enumeration to cleanup. This API returns an indication of success or failure. The error indication includes an indication of an error due to an invalid handle.

The peer group get item count API is used to retrieve the maximum number of items in an enumeration. Since some items may become invalid while iterating over the enumeration, the number of items returned from the peer group get next item API may be less than the item count returned here. This is indicative of the number of items in the enumeration when the handle is first created. Due to the dynamic nature of the infrastructure, there is no guarantee that the number of items retrieved via the peer group get next item API will be equal to this count. The parameters for this API are the group handle, and the number of records in the enumeration. This API returns an indication of success or failure. The error indication includes an indication of an error due to an invalid argument.

The peer group free data API frees resources returned by various grouping APIs discussed above. Any data returned by a grouping API must be freed using this API. The parameter for this API is a pointer to item to free.

The system and methods of the present invention also provide for member to member direct communication. The direct communication APIs allow members to send messages to each other without having to flood the data. An application can send data to either a neighbor (i.e. a member with whom it has a connection because of the grouping infrastructure) or a direct connection (i.e. a remote member that is connected to the local member because it initiated the connection with a direct communication API). If an application wishes to create a direct connection, it must call the peer group open direct connection API first. This establishes the connection. Once the connection is established, the member is able to send data on it via the peer group send data API. It is important to note that the application can describe the type of data being sent via the "type" parameter in the send API. Once an application is finished with a direct connection, it must call the peer group close direct connection API to tear down the connection. A direct connection does not count in group's graph maintenance. An application can also send data to a neighbor member by specifying the neighbor flag and using the peer group send data API. It need not call either of the direct connection establishment/closing functions.

These direct connection APIs utilize a direct communication structure called the peer connection information structure. The parameters for this structure include the size of the structure being passed in, the type of connection to which this structure refers, the connection ID of this connection, the member ID of the member on the other end of this connection, the PeerID of the member to which the application has a connection, and the address of the connection. The type of connection is indicated by two flags. The peer connection neighbor flag specifies that this connection is a neighbor connection, and the peer connection direct flag specifies that this connection is a direct connection.

The peer group open direct connection API creates a direct connection as stated above. The grouping APIs allow an application to establish a connection with a member in the group in order to send data. Both peers must be members of the group. This API can be called multiple times, but each call to the open function must have a matching close call (discussed below). The parameters for this API include the handle of the group, the unique ID of a person to whom to connect at an address (required since multiple identities may be connected at the specified address), a pointer to structure containing details about address, etc. of the member to which to connect, and the connection ID of this direct connection. This API returns an indication of success or failure. The error indications include an indication of an error due to an invalid argument, and if no peer with the given ID exists. There may also be an error to denote that the peer member refused the connection.

The peer group close direct connection API closes down a specific direct connection. The parameters for this API are the handle of the group, and the ID of the neighbor to disconnect. This API returns an indication of success or failure. The error indications include an indication of an error due to an invalid argument, and if no connection with the given ID exists.

The peer group send data API is used to send data to a connected neighbor or a direct connection. This function will return as soon as data has been handed off to the network layer. In other words, the grouping layer does not wait for an acknowledgement (ack) from the other side. The parameters for this API include the handle of the group, the unique identifier for the connection on which to send data, an application defined "type" of the data sent, a count of bytes pointed to by the next parameter, and the actual data to send to the neighbor. The mechanism for receiving this point to point data is to register for an event of type peer group event incoming data. This API returns an indication of success or failure. The error indications include an indication of an error due to an invalid argument, and if the connection does not exist.

The peer group enumerate connections API includes as its parameters the handle of the group, the type of the connection to enumerate based on the peer connection flags discussed above, and a pointer to the enumeration of connections. This API returns an indication of success or failure. The error indications include an indication of an error due to an invalid argument, and if the connection does not exist.

The events infrastructure of the present invention allows applications to be notified about changes to the group and the data associated with it. If an application would like to receive a notification about a change, the first thing it must do is fill out a registration structure that specifies the event about which it would like to be notified. The registration allows applications to specify the event type about which it would like to be notified. If the event has a specific type of data with which it can be associated, this is also specified in the registration. For instance, an application can register for notifications about changes to a particular record type. To do this, it creates a registration structure specifying the peer group event record changed event as the event type, and the GUID of the record type about which it would like to be notified.

Once an application has the registration structure, it calls the peer group register event API, specifying the event handle with which it would like the event associated. It is important to note that several events can be associated with an event handle. Once an event occurs for which the application is interested, the event handle gets signaled that an event has occurred. The application must now call the peer group get event data API to retrieve the data associated with the event. This API returns a structure that contains two key pieces of data. The first is the registration associated with the event, and the second is the data associated with that event. An application should continue to call the peer group get event data until the error message indicating that there are no more items occurs. When an application no longer wants to be notified about events associated with a particular handle, it simply un-registers its interest by calling the peer group un-register event API.

The events infrastructure of the present invention utilizes seven data structures. The first is the peer group event registration structure. When an application registers for an event notification, it supplies an array of peer event registration structures, which contain context data needed to interpret the notification registration and which will be used to return data relevant to a notification when one occurs. This parameters of this structure include the type of events in which the peer is interested (must be one of the event types specified below), and the record type. If the event type specified operates on records, this record type may be specified to only fire events on records of the specified record type. This parameter may be NULL to have the event fire for all record types. This field is ignored for event types that do not operate on records. The registration takes an event type for which the application wants to be notified.

The event types may include events related to the group has changed status (became connected, etc), a field in the group property structure has changed (no data is available if this event is fired because the application already has the change and must use the peer group get properties API to get the updated structure), a record type (or specific record) has changed in some manner, a peer's direct connection has changed, a connection with a peer neighbor has changed, data has been received from a direct or neighbor connection (as opposed to flooded), that the state of a particular member in the group has changed, that the connection attempt made by the peer group connect or peer group join function has failed (i.e. a member in the cloud could not be connected), or that a member in the group has a renewal that must be authorized.

Once an application receives an event notification, it can get the data associated with that event. All data is generalized into the peer group event data structure. Depending on the event, the appropriate field in the union is filled out. All but one of the fields in the union is a pointer to a structure. Each member of the union is defined. The event registration is the type of event registration that was passed into the peer group register event API, the status field is filled in if the peer group event status change event fires. It means something has happened in relation to a member's connection with the group. The incoming data field is filled in if the peer group event neighbor data or the peer group event direct data event is fired. This means that a member has received data from the neighbor or a direct connection not flooded. The record change data field is filled in if the peer group event record change event is fired. It means that a record or record type for which the application asked for notifications has changed. The connection change data field is filled in if the peer group event neighbor connection or the peer group event direct connection event is fired. It means that some aspect of the neighbor or direct connection state has changed. The member change data field is filled in if the peer group event member changed event is fired. It means that some member in the group presence state has changed. The peer membership information data field is the membership information of the peer whose renewal needs to be authorized when the peer group event membership authorization event is fired.

The peer group status structure includes information concerning the change of the group status. The peer group status listening field provides an indication that the group is listening for incoming connections. This is received after the peer group connect API is called and the group is listening for connections. The peer group status has connections field indicates that the peer in the group has a connection or connections. This is received after a group member has a new group connection established to them. This does not mean that a direction connection has occurred, rather it is more general saying a member is connected to the group.

In the peer event incoming data structure, the union contains a pointer to the data if an incoming data event is fired. It means that a member has received data from the neighbor or a direct connection, not flooded. The fields of this structure include the size of the structure, the unique identifier for the connection that the data came from, the application defined data type of the incoming data, and the actual data received.

The peer event record change data is the structure to which the union contains a pointer if the peer group event record change event is fired. It means that a record or record type for which the application has asked for notifications has changed. This structure includes the size of the structure, the type of change that has occurred to a record or record type for which the application has subscribed events, the unique record ID that has been changed, and the unique record type that has been changed. The peer record change types include the peer record added type to indicate that a record ID or record type has been added to the database, a peer record updated type to indicate that a record ID or record type has been updated in the group, a peer record deleted type to indicate that a record ID or record type has been deleted from the group, and a peer record expired type to indicate that a record ID or record type has expired out of the database.

The peer event connection change data structure is the data structure to which the union contains a pointer if the peer group event neighbor connection event or the peer group event direct connection event is fired. This means that some aspect of the neighbor or direct connection state has changed. This structure includes the size of the structure, the type of change the neighbor or direct connection has experienced, the unique identifier for the connection from which the change came, and the unique identifier for the node that changed. The peer connection status types include a peer connected type indicating that a new member has connected to the local member, a peer disconnected type indicating that the connection has disconnected (could be done by the local member or by a remote member), and a peer connection failed type indicating that the connection attempt to the member has failed.

The peer event member change data structure is the data structure to which the union contain a pointer to the peer group event member changed is fired. It means that some aspect of a neighbor or direct connection state has changed. This structure includes the size of the structure, the type of change that has happened to the particular member, and the peer name of the member that has changed. The change types include indications that a member has connected (become present) in the group, has disconnected (gone offline) from the group, has updated a piece of the member's information (e.g. IP address, etc.), has joined the group, or has left the group.

Having now described the events infrastructure and the data structures used therein, attention is now directed to the details of the individual APIs. The peer group register event API registers the member's interest in being notified of changes associated with a group and event type. The application creates an event handle and passes in the handle and events for which that handle should be notified. When any one of those events is triggered, the handle receives a notification, and must get the data associated with that event by calling the peer group get event data function. The parameters for the peer group register event API include the handle of the group, and an event handle to be signaled on a new event. The event handle should be auto-reset. When signaled, the application must call the peer group get event data API until an indicating that there are no more items to retrieve is returned. The parameters also include a count of the number of peer event registration data structures, a pointer to an array of peer event registration data structures containing data about notifications being requested, and a peer event handle that can be used in a call to the peer un-register event handle API to un-register a notification. This API returns an indication of success or failure. The failure indication includes an indication of failure due to an invalid argument.

The peer group un-register event API un-registers the application's interest in being notified of changes associated with a group and record type. The parameter for this API is the handle obtained from the call to the peer register event handle API. This API returns an indication of success or failure. The failure indication includes an indication of failure due to an invalid argument.

The peer group get event data API allows an application to retrieve events. An indication is returned to indicate that there are no more events to retrieve. All events receive data in the form of the peer group event data structure. Depending on what event was fired, the corresponding data structure is returned. The parameters for this API include the handle obtained by a call to the peer register event handle API, and the data about the notification.

Another grouping of APIs are the time related APIs. Specifically, the peer group peer time to universal time API and the peer group universal time to peer time API may be used to convert the groups "peer time" to the local machine's UTC time and vice versa. The parameters of these APIs are a handle to the group and the peer time or the universal time, depending on which API is being called. These APIs return, respectively, the universal time corresponding to the peer time, or the peer time corresponding to the universal time. These APIs return an indication of success or failure.

In one embodiment of the interfaces and methods of the present invention that is particularly well suited for the Microsoft Windows XP operating system, the APIs may be as follows:

```
HRESULT WINAPI PeerGroupStartup(
    IN WORD             wVersionRequested,
    OUT PPEER_VERSION_DATA pVersionData);
HRESULT WINAPI PeerGroupShutdown( );
VOID WINAPI PeerFreeData(
    IN PVOID            pvData);
HRESULT WINAPI PeerGetItemCount(
    IN HPEERENUM        hPeerEnum,
    OUT PULONG          pCount);
HRESULT WINAPI PeerGetNextItem(
    IN HPEERENUM        hPeerEnum,
    IN OUT PULONG       pCount,
    OUT PVOID      *    ppvItems);
HRESULT WINAPI PeerEndEnumeration(
    IN HPEERENUM        hPeerEnum);
////////////////////////////////////////////////
// Group interfaces
HRESULT WINAPI PeerGroupCreate(
    IN PPEER_GROUP_PROPERTIES pProperties,
    OUT HGROUP     *    phGroup);
HRESULT WINAPI PeerGroupOpen(
    IN PCWSTR           pwzIdentity,
    IN PCWSTR           pwzGroupPeerName,
    IN PCWSTR           pwzCloud,
    OUT HGROUP     *    phGroup);
HRESULT WINAPI PeerGroupJoin(
    IN PCWSTR           pwzIdentity,
    IN PCWSTR           pwzInvitation,
    IN PCWSTR           pwzCloud,
    OUT HGROUP     *    phGroup);
HRESULT WINAPI PeerGroupConnect(
    IN HGROUP           hGroup);
HRESULT WINAPI PeerGroupClose(
    IN HGROUP           hGroup);
HRESULT WINAPI PeerGroupDelete(
    IN PCWSTR           pwzIdentity,
    IN PCWSTR           pwzGroupPeerName);
HRESULT WINAPI PeerGroupCreateInvitation(
    IN HGROUP           hGroup,
    IN PCWSTR           pwzIdentityInfo,
    IN FILETIME *       pftExpiration,
    IN ULONG            cRoles,
    IN PEER_ROLE_ID*    pRoles,
    OUT PWSTR      *    ppwzInvitation);
HRESULT WINAPI PeerGroupParseInvitation(
    IN PCWSTR           pwzInvitation,
    OUT PPEER_INVITATION_INFO * ppInvitationInfo);
HRESULT WINAPI PeerGroupGetStatus(
    IN HGROUP           hGroup,
    OUT DWORD      *    pdwStatus);
HRESULT WINAPI PeerGroupGetProperties(
    IN HGROUP           hGroup,
    OUT PPEER_GROUP_PROPERTIES * ppProperties);
HRESULT WINAPI PeerGroupSetProperties(
    IN HGROUP           hGroup,
    IN PPEER_GROUP_PROPERTIES pProperties);
HRESULT WINAPI PeerGroupEnumMembers(
    IN HGROUP           hGroup,
    IN DWORD            dwFlags,    // PEER_MEMBER_FLAGS
    IN PCWSTR           pwzIdentity,
    OUT HPEERENUM  *    phPeerEnum);
HRESULT WINAPI PeerGroupOpenDirectConnection(
    IN HGROUP           hGroup,
    IN PCWSTR           pwzIdentity,
    IN PPEER_ADDRESS pAddress,
    OUT ULONGLONG *     pullConnectionId);
HRESULT WINAPI PeerGroupCloseDirectConnection(
    IN HGROUP           hGroup,
    IN ULONGLONG        ullConnectionId);
HRESULT WINAPI PeerGroupEnumConnections(
    IN HGROUP           hGroup,
```

-continued

```
    IN DWORD             dwFlags,       //
PEER_CONNECTION_FLAGS
    OUT HPEERENUM *      phPeerEnum);
HRESULT WINAPI PeerGroupSendData(
    IN HGROUP            hGroup,
    IN ULONGLONG         ullConnectionId,
    IN GUID *            pType,
    IN ULONG             cbData,
    IN PVOID             pvData);
// Eventing interfaces
HRESULT WINAPI PeerGroupRegisterEvent(
    IN HGROUP            hGroup,
    IN HANDLE            hEvent,
    IN DWORD             cEventRegistration,
    IN PPEER_GROUP_EVENT_REGISTRATION
pEventRegistrations,
    OUT HPEEREVENT * phPeerEvent);
HRESULT WINAPI PeerGroupUnregisterEvent(
    IN HPEEREVENT        hPeerEvent);
HRESULT WINAPI PeerGroupGetEventData(
    IN HPEEREVENT        hPeerEvent,
    OUT PPEER_GROUP_EVENT_DATA * ppEventData);
// Data Storage
HRESULT WINAPI PeerGroupGetRecord(
    IN HGROUP            hGroup,
    IN GUID *            pRecordId,
    OUT PPEER_RECORD * ppRecord);
HRESULT WINAPI PeerGroupAddRecord(
    IN HGROUP            hGroup,
    IN PPEER_RECORD      pRecord,
    OUT GUID     *       pRecordId);
HRESULT WINAPI PeerGroupUpdateRecord(
    IN HGROUP            hGroup,
    IN PPEER_RECORD pRecord);
HRESULT WINAPI PeerGroupDeleteRecord(
    IN HGROUP            hGroup,
    IN GUID *            pRecordId);
HRESULT WINAPI PeerGroupEnumRecords(
    IN HGROUP            hGroup,
    IN GUID *            pRecordType,
    OUT HPEERENUM   *    phPeerEnum);
HRESULT WINAPI PeerGroupSearchRecords(
    IN HGROUP            hGroup,
    IN PCWSTR            pwzCriteria,
    OUT HPEERENUM * phPeerEnum);
HRESULT WINAPI PeerGroupExportDatabase(
    IN HGROUP            hGroup,
    IN PCWSTR            pwzFilePath);
HRESULT WINAPI PeerGroupImportDatabase(
    IN HGROUP            hGroup,
    IN PCWSTR            pwzFilePath);
HRESULT WINAPI PeerGroupAuthorizeMembership(
    IN HGROUP            hGroup,
    IN PPEER_MEMBERSHIP_INFO pMemberInfo,
    IN BOOL              fAuthorize);
HRESULT WINAPI PeerGroupPeerTimeToUniversalTime(
    IN HGROUP            hGroup,
    IN FILETIME *        pftPeerTime,
    OUT FILETIME *       pftUniversalTime);
HRESULT WINAPI PeerGroupUniversalTimeToPeerTime(
    IN HGROUP            hGroup,
    IN FILETIME *        pftUniversalTime,
    OUT FILETIME *       pftPeerTime);
```

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of providing an interface for use by an application program in a peer-to-peer computing system to establish peer-to-peer groups and pass data between members of the peer-to-peer groups, comprising the steps of:
   receiving from the application program a peer group startup function call including a requested version of a peer-to-peer grouping infrastructure;
   utilizing peer version information to determine an output parameter, the peer version information including an expected version of the peer-to-peer grouping infrastructure and a highest version of the peer-to-peer grouping infrastructure;
   providing the output parameter of the peer group startup function call, the output parameter based on the peer version information and pointing to the peer version information;
   returning a return value indicating the success or failure of the peer group startup function call;
   receiving from the application program a peer-to-peer group management call having a plurality of parameters;
   parsing the peer-to-peer group management call to retrieve the plurality of parameters;
   imparting the plurality of parameters to the peer version information of the peer-to-peer grouping infrastructure indicated by the output parameter of the peer group startup function call;
   returning to the application program a value indicative of the success/failure of the peer-to-peer group management call corresponding to the imparted plurality of parameters;
   receiving from the application program a peer group shutdown function call corresponding to the received peer group startup function call, the peer group shutdown function call for cleaning up resources allocated by the received peer group startup function call; and
   returning an indication of success or failure of the peer group shutdown function call.

2. The method of claim 1, further comprising receiving from the application program a peer-to-peer group create call having a plurality of call parameters comprising properties of a peer-to-peer group, and a handle to the peer-to-peer group.

3. The method of claim 1, further comprising receiving from the application program a peer-to-peer group open call having a plurality of call parameters comprising a first unique identifier of a peer-to-peer group to be opened, a peer name of the peer-to-peer group being opened, identification of a cloud in which to advertise the peer-to-peer group that is being opened, and a pointer to a handle for the peer-to-peer group.

4. The method of claim 1, further comprising receiving from the application program a peer-to-peer group join call having a plurality of call parameters comprising a first identity being used to join a peer-to-peer group, an invitation given to a peer to join the peer-to-peer group, a cloud in which to find the peer-to-peer group that the peer wishes to join, and a handle to the peer-to-peer group.

5. The method of claim 1, further comprising receiving from the application program a peer-to-peer group connect call having a plurality of call parameters comprising a handle of a peer-to-peer group to which to connect.

6. The method of claim 1, further comprising receiving from the application program a peer-to-peer group close call having a plurality of call parameters comprising a handle to a peer-to-peer group from which to disconnect.

7. The method of claim 1, further comprising receiving from the application program a peer-to-peer group delete call having a plurality of call parameters comprising an identity to delete the peer-to-peer group from, and a peer name of the peer-to-peer group to delete from the identity and the peer name of the peer-to-peer group to delete data from.

8. The method of claim 1, further comprising receiving from the application program a peer-to-peer group create invitation call having a plurality of call parameters comprising a handle to a peer-to-peer group for which the invitation pertains, identity information of a peer to be invited, a count of roles assigned to the peer, a pointer to role information being assigned to the peer, a point in time at which the invitation will expire, and a pointer to the invitation.

9. The method of claim 1, further comprising receiving from the application program a peer-to-peer group parse invitation call having a plurality of call parameters comprising a handle to a peer-to-peer group for which the invitation pertains, and a pointer to a pointer of an invitation information structure.

10. A method of providing an interface for use by an application program in a peer-to-peer computing system to manage peer-to-peer group and member information, comprising the steps of:
receiving from the application program a peer-to-peer group and member information management call having a plurality of parameters;
parsing the peer-to-peer group and member information management call to retrieve the plurality of parameters;
imparting the plurality of parameters to a version of a peer-to-peer grouping infrastructure established by a peer group startup function call by:
using peer address information, the peer address information including an address of a given node, a port of the given node, and a peer neighbor's address;
using peer member information corresponding to a member, the peer member information including an indication of a state of the member, a friendly name of the member, a node identification of the member, a count of addresses in the peer member information, a pointer to IP address of the member, attributes of the member, and a time at which the member's group credentials expire; and
using peer group membership information corresponding to the member, the peer group membership information including a peer name for a peer group, a peer name of an issuer of a group invitation corresponding to the peer group, a peer name of an individual for whom the group invitation is directed, a start and an end time of a validity period of the group invitation, a count of roles for the individual for whom the group invitation is directed, a pointer to peer role identifications of the individual, a count of classifiers associated with the peer group, a pointer to an array of classifiers associated with the peer group, and a pointer to a public key of a subject of the peer group; and
returning to the application program a value indicative of the success/failure of the peer-to-peer group and member information management call corresponding to the imparted plurality of parameters.

11. The method of claim 10, further comprising receiving from the application program a get peer-to-peer group properties call having a plurality of call parameters comprising a peer-to-peer group handle, and a pointer to the peer-to-peer group properties.

12. The method of claim 10, further comprising receiving from the application program a get peer-to-peer group status call having a plurality of call parameters comprising a peer-to-peer group handle, a set of peer group status flags that are currently set as the status of the peer-to-peer group.

13. The method of claim 10, further comprising receiving from the application program a set peer-to-peer group properties call having a plurality of call parameters comprising a peer-to-peer group handle, and a pointer to a peer-to-peer group properties data structure.

14. The method of claim 10, further comprising receiving from the application program a peer group enumerate members call having a plurality of call parameters comprising a first handle to the peer-to-peer group, a flag indicating whether or not to enumerate only members who are present, an identity of a particular peer to enumerate, and a second handle to an enumeration of the members.

15. The method of claim 10, further comprising receiving from the application program a peer group authorize membership call having a plurality of call parameters comprising a handle to the peer-to-peer group, a pointer to membership information representing credentials of a member who needs renewal, and a flag indicating whether or not to authorize the renewal of the member's credentials.

16. A method of providing an interface for use by an application program in a peer-to-peer computing system to manage peer-to-peer record management, comprising the steps of:
receiving from the application program a peer-to-peer record management call having a plurality of parameters;
parsing the peer-to-peer record management call to retrieve the plurality of parameters;
imparting the plurality of parameters to a version of a peer-to-peer grouping infrastructure established by a peer group startup function call by using peer record information corresponding to a record of a member of a peer-to-peer group, the peer record information including a type of the record, an identification of the record, a record version, an identifier of a record creator, one or more flags corresponding to processing to be applied to the record, an identifier of a last changer of the record, a set of attribute-value pairs to be associated with the record, security data for the record, and record data; and
returning to the application program a value indicative of the success/failure of the peer-to-peer record management call corresponding to the imparted plurality of parameters.

17. The method of claim 16, further comprising receiving from the application program an add record call having a plurality of call parameters comprising a peer-to-peer group handle corresponding to the peer-to-peer group, a pointer to the record data, and a pointer to the record identification that uniquely identifies the record.

18. The method of claim 16, further comprising receiving from the application program an update record call having a plurality of call parameters comprising a peer-to-peer group handle corresponding to the peer-to-peer group, and a pointer to new data to associate with the record.

19. The method of claim 16, further comprising receiving from the application program a delete record call having a plurality of call parameters comprising a peer-to-peer group handle corresponding to the peer-to-peer group, and a pointer to a record identification of a record to delete.

20. The method of claim 16, further comprising receiving from the application program a get record call having a plurality of call parameters comprising a peer-to-peer group handle corresponding to the peer-to-peer group, a pointer to a record identification of a record to retrieve, and a pointer to the retrieved record.

21. The method of claim 16, further comprising receiving from the application program an enumerate records call having a plurality of call parameters comprising a peer-to-peer group handle corresponding to the peer-to-peer group, a pointer to a type of record over which to iterate, and a handle to the iteration.

22. The method of claim 16, further comprising receiving from the application program a search records call having a plurality of call parameters comprising a peer-to-peer group handle corresponding to the peer-to-peer group, an XML string describing a query, and an enumeration handle.

23. A method of providing an interface for use by an application program in a peer-to-peer computing system to export a peer-to-peer group database, comprising the steps of:
receiving from the application program an export database call having a plurality of parameters comprising a peer-to-peer group handle corresponding to an opened peer-to-peer group to which a member is connected, a path to a file in which data to be exported is to be stored, and a password used to encrypt the peer-to-peer group database;
parsing the export database call to retrieve the plurality of parameters;
imparting the plurality of parameters to a version of a peer-to-peer grouping infrastructure established by a peer group startup function call; and
returning to the application program a value indicative of the success/failure of the export database call corresponding to the imparted plurality of parameters.

24. A method of providing an interface for use by an application program in a peer-to-peer computing system to import a file representing a peer-to-peer group database, comprising the steps of:
receiving from the application program an import database call having a plurality of parameters comprising a peer-to-peer group handle corresponding to a peer-to-peer group to which a user is unconnected, a path to a file to import, and a password used to decrypt the peer-to-peer group database;
parsing the import database call to retrieve the plurality of parameters;
imparting the plurality of parameters to a version of a peer-to-peer grouping infrastructure established by a peer group startup function call; and
returning to the application program a value indicative of the success/failure of the import database call corresponding to the imparted plurality of parameters.

25. A method of providing an interface for use by an application program in a peer-to-peer computing system to manage peer-to-peer groups, comprising the steps of:
receiving from the application program a peer-to-peer group utility function call having a plurality of parameters, the peer-to-peer group utility function call including one from the set consisting of: an enumeration support call operating on a received peer group enumeration handle and a memory support call for freeing data from a grouping API;
parsing the peer-to-peer group utility function call to retrieve the plurality of parameters;
imparting the plurality of parameters to a version of a peer-to-peer grouping infrastructure established by a peer group startup function call; and returning to the application program a value indicative of the success/failure of the peer-to-peer group utility function call corresponding to the imparted plurality of parameters.

26. The method of claim 25, further comprising receiving from the application program a get next item call having a plurality of call parameters comprising the received peer group enumeration handle, a count of a number of items to read from an enumeration corresponding to the received peer group enumeration handle, and a pointer to an array of items to be read from the enumeration.

27. The method of claim 25, further comprising receiving from the application program an end enumeration call having a plurality of call parameters comprising the received peer group enumeration handle corresponding to an enumeration to cleanup.

28. The method of claim 25, further comprising receiving from the application program a get item count call having a plurality of call parameters comprising the received peer group enumeration handle, and a count of a number of records in an enumeration corresponding to the received peer group enumeration handle.

29. The method of claim 25, further comprising receiving from the application program a free data call having a plurality of call parameters comprising a pointer to an item to be freed of the data from the grouping API.

30. A method of providing an interface for use by an application program in a peer-to-peer computing system to communicate without flooding between a first and a second group member node of a peer-to-peer group, comprising the steps of:
receiving from the application program a peer-to-peer group direct communication management call having a plurality of parameters;
parsing the peer-to-peer group direct communication management call to retrieve the plurality of parameters;
imparting the plurality of parameters to a version of a peer-to-peer grouping infrastructure established by a peer group startup function call by utilizing peer communication information corresponding to an opened connection between the first and second group member nodes, the peer communication information including a type of the opened connection, a connection identification of the opened connection, a member identification of the second group member node, a peer identification of the first group member node, and an address of the opened connection; and
returning to the application program a value indicative of the success/failure of the peer-to-peer group direct communication management call corresponding to the imparted plurality of parameters.

31. The method of claim 30, further comprising receiving from the application program an open direct communication call having a plurality of call parameters comprising a peer-to-peer group handle corresponding to the peer-to-peer group, an unique identification of a person to whom to connect at a given address, a pointer to a structure containing details about the person to whom to connect, and a connection identification of a direct connection.

32. The method of claim 30, further comprising receiving from the application program a close direct connection call having a plurality of call parameters comprising a peer-to-peer group handle corresponding to the peer-to-peer group, and an identification of a neighbor from whom to disconnect.

33. The method of claim 30, further comprising receiving from the application program a send data call having a plurality of call parameters comprising a peer-to-peer group handle corresponding to the peer-to-peer group, a unique identifier for the opened connection on which to send data, an application defined type of data to be sent, a count of bytes of the data, and the data to send to the neighbor.

34. The method of claim 30, further comprising receiving from the application program an enumerate connections call having a plurality of call parameters comprising a peer-to-peer group handle corresponding to the peer-to-peer group, a type of connection to enumerate, and a pointer to an enumeration of the connections.

35. A method of providing an interface for use by an application program in a peer-to-peer computing system allow the application program to be notified about changes to a peer-to-peer group to which a group member node corresponding to the application program belongs and changes to data associated with the peer-to-peer group, comprising the steps of:
ensuring that registration information exists corresponding to the application program, the registration information including an event type for which the application program desires to be notified;
receiving from the application program a peer-to-peer events infrastructure management call having a plurality of parameters, the peer-to-peer events infrastructure management call for managing a notification of an event, the event including a change to the peer-to-peer group or a change to the data associated with the peer-to-peer group;
parsing the peer-to-peer events infrastructure management call to retrieve the plurality of parameters;
imparting the plurality of parameters to a version of a peer-to-peer grouping infrastructure established by a peer group startup function; and
returning to the application program a value indicative of the success/failure of the peer-to-peer events infrastructure management call corresponding to the imparted plurality of parameters.

36. The method of claim 35, further comprising receiving from the application program a register event call having a plurality of call parameters comprising a peer-to-peer group handle corresponding to the peer-to-peer group, an NT event handle to be signaled on a new event, a count of peer event registration structures, an array of peer event registration structures containing data about notifications being requested, a pointer to a peer event handle that can be used in a call to un-register a notification.

37. The method of claim 35, further comprising receiving from the application program an un-register event call having a plurality of call parameters comprising a peer event handle of the event to un-register.

38. The method of claim 35, further comprising receiving from the application program a get event data call having a plurality of call parameters comprising a peer event handle, and a pointer to the event data.

39. A computer-readable storage medium tangibly embodying a program of instruction executable by a computer for performing steps to provide an interface for use by an application program in a peer-to-peer computing system for establishing peer-to-peer groups and passing data between members of the peer-to-peer groups, the steps comprising:
receiving from the application program a peer group startup function call including a requested version of a peer-to-peer grouping infrastructure;
utilizing peer version information to determine an output parameter, the peer version information including an expected version of the peer-to-peer grouping infrastructure and a highest version of the peer-to-peer grouping infrastructure;
providing the output parameter of the peer group startup function call, the output parameter based on the peer version information and pointing to the peer version information;
returning a return value indicating the success or failure of the peer group startup function call;
receiving from the application program a peer-to-peer group management call having a plurality of parameters;
parsing the peer-to-peer group management call to retrieve the plurality of parameters;
imparting the plurality of parameters to the peer version information of the peer-to-peer grouping infrastructure indicated by the output parameter of the peer group startup function call;
returning to the application program a value indicative of the success/failure of the peer-to-peer group management call corresponding to the imparted plurality of parameters;
receiving from the application program a peer group shutdown function call corresponding to the received peer group startup function call, the peer group shutdown function call for cleaning up resources allocated by the received peer group startup function call; and
returning an indication of success or failure of the peer group shutdown function call.

40. The computer-readable medium of claim 39, further comprising an additional program of instruction executable by a computer for performing the step of receiving from the application program a peer-to-peer group create call having a plurality of call parameters comprising properties of a peer-to-peer group, and a handle to the peer-to-peer group.

41. The computer-readable medium of claim 39, further comprising receiving from the application program a peer-to-peer group open call having a plurality of call parameters comprising a first unique identifier of a peer-to-peer group to be opened, a peer name of the group being opened, identification of a cloud in which to advertise the peer-to-peer group that is being opened, and a pointer to a handle for the peer-to-peer group.

42. The computer-readable medium of claim 39, further comprising receiving from the application program a peer-to-peer group join call having a plurality of call parameters comprising a first identity being used to join a peer-to-peer group, an invitation given to a peer to join the peer-to-peer group, a cloud in which to find the peer-to-peer group that the peer wishes to join, and a handle to the peer-to-peer group.

43. The computer-readable medium of claim 39, further comprising receiving from the application program a peer-to-peer group connect call having a plurality of call parameters comprising a handle of a peer-to-peer group to which to connect.

44. The computer-readable medium of claim 39, farther comprising receiving from the application program a peer-to-peer group close call having a plurality of call parameters comprising a handle to a peer-to-peer group from which to disconnect.

45. The computer-readable medium of claim 39, farther comprising receiving from the application program a peer-to-peer group delete call having a plurality of call parameters comprising an identity to delete the peer-to-peer group from, and a peer name of the peer-to-peer group to delete from the identity and the peer name of the peer-to-peer group to delete data from.

46. The computer-readable medium of claim 39, farther comprising receiving from the application program a peer-to-peer group create invitation call having a plurality of call parameters comprising a handle to a peer-to-peer group for which the invitation pertains, identity information of a peer to be invited, a count of roles assigned to the peer, a pointer to role information being assigned to the peer, a point in time at which the invitation will expire, and a pointer to the invitation.

47. The computer-readable medium of claim 39, farther comprising receiving from the application program a peer-to-peer group parse invitation call having a plurality of call parameters comprising a handle to a peer-to-peer group for which the invitation pertains, and a pointer to a pointer of an invitation information structure.

48. A computer-readable storage medium tangibly embodying a program of instruction executable by a computer for performing steps to provide an interface for use by an application program in a peer-to-peer computing system for managing peer-to-peer group and member information, comprising:

receiving from the application program a peer-to-peer group and member information management call having a plurality of parameters;

parsing the peer-to-peer group and member information management call to retrieve the plurality of parameters;

imparting the plurality of parameters to a version of a peer-to-peer grouping infrastructure established by a peer group startup function call by:

using peer address information, the peer address information including an address of a given node, a port of the given node, and a peer neighbor's address;

using peer member information corresponding to a member, the peer member information including an indication of a state of the member, a friendly name of the member, a node identification of the member, a count of addresses in the peer member information, a pointer to IP address of the member, attributes of the member, and a time at which the member's group credentials expire; and using peer group membership information corresponding to the member, the peer group membership information including a peer name for a peer group, a peer name of an issuer of a group invitation corresponding to the peer group, a peer name of an individual for whom the group invitation is directed, a start and an end time of a validity period of the group invitation, a count of roles for the individual for whom the group invitation is directed, a pointer to peer role identifications of the individual, a count of classifiers associated with the peer group, a pointer to an array of classifiers associated with the peer group, and a pointer to a public key of a subject of the peer group; and returning to the application program a value indicative of the success/failure of the peer-to-peer group and member information management call corresponding to the imparted plurality of parameters.

49. The computer-readable medium of claim 48, further comprising receiving from the application program a peer group enumerate members call having a plurality of call parameters comprising a first handle to the peer-to-peer group, a flag indicating whether or not to enumerate only members who are present, an identity of a particular peer to enumerate, and a second handle to an enumeration of the members.

50. The computer-readable medium of claim 48, further comprising receiving from the application program a peer group authorize membership call having a plurality of call parameters comprising a handle to the peer-to-peer group, a pointer to membership information representing credentials of a member who needs renewal, and a flag indicating whether or not to authorize the renewal of the member's credentials.

51. The computer-readable medium of claim 48, further comprising receiving from the application program a get peer-to-peer group properties call having a plurality of call parameters comprising a peer-to-peer group handle, and a pointer to the peer-to-peer group properties.

52. The computer-readable medium of claim 48, further comprising receiving from the application program a get peer-to-peer group status call having a plurality of call parameters comprising a peer-to-peer group handle, a set of peer group status flags that are currently set as the status of the peer-to-peer group.

53. The computer-readable medium of claim 48, further comprising receiving from the application program a set peer-to-peer group properties call having a plurality of call parameters comprising a peer-to-peer group handle, and a pointer to a peer-to-peer group properties data structure.

54. A computer-readable storage medium tangibly embodying a program of instruction executable by a computer for performing steps to provide an interface for use by an application program in a peer-to-peer computing system for managing peer-to-peer record management, comprising:

receiving from the application program a peer-to-peer record management call having a plurality of parameters;

parsing the peer-to-peer record management call to retrieve the plurality of parameters;

imparting the plurality of parameters to a version of a peer-to-peer grouping infrastructure established by a peer group startup function call by using peer record information corresponding to a record of a member of a peer-to-peer group, the peer record information including a type of the record, an identification of the record, a record version, an identifier of a record creator, one or more flags corresponding to processing to be applied to the record, an identifier of a last changer of the record, a set of attribute-value pairs to be associated with the record, security data for the record, and record data; and returning to the application program a value indicative of the success/failure of the peer-to-peer record management call corresponding to the imparted plurality of parameters.

55. The computer-readable medium of claim 54, further comprising receiving from the application program an add record call having a plurality of call parameters comprising a peer-to-peer group handle corresponding to the peer-to-peer group, a pointer to the record data, and a pointer to the record identification that uniquely identifies the record.

56. The computer-readable medium of claim 54, further comprising receiving from the application program an update record call having a plurality of call parameters comprising a peer-to-peer group handle corresponding to the peer-to-peer group, and a pointer to new data to associate with a record.

57. The computer-readable medium of claim 54, further comprising receiving from the application program a delete record call having a plurality of call parameters comprising a peer-to-peer group handle corresponding to the peer-to-peer group, and a pointer to a record identification of a record to delete.

58. The computer-readable medium of claim 54, further comprising receiving from the application program a get record call having a plurality of call parameters comprising a peer-to-peer group handle corresponding to the peer-to-peer group, a pointer to a record identification of a record to retrieve, and a pointer to the retrieved record.

59. The computer-readable medium of claim 54, further comprising receiving from the application program an enumerate records call having a plurality of call parameters comprising a peer-to-peer group handle corresponding to the peer-to-peer group, a pointer to a type of record over which to iterate, a pointer to a peer identification for which records are to be iterated, and a handle to the iteration.

60. The computer-readable medium of claim 54, further comprising receiving from the application program a search records call having a plurality of call parameters comprising a peer-to-peer group handle corresponding to the peer-to-peer group, an XML string describing a query, and an enumeration handle.

61. A computer-readable storage medium tangibly embodying a program of instruction executable by a computer for performing steps to provide an interface for use by an application program in a peer-to-peer computing system to export a peer-to-peer group database, comprising:
  receiving from the application program a-peer-to-peer export database call having a plurality of parameters comprising a group handle corresponding to an opened peer-to-peer group to which a member is connected, and a path to a file in which data to be exported is to be stored, and a password used to encrypt the peer-to-peer group database;
  parsing the peer-to-peer export database call to retrieve the plurality of parameters;
  imparting the plurality of parameters to a version of a peer-to-peer grouping infrastructure established by a peer group startup function call; and
  returning to the application program a value indicative of the success/failure of the peer-to-peer export database call corresponding to the imparted plurality of parameters.

62. A computer-readable storage medium tangibly embodying a program of instruction executable by a computer for performing steps to provide an interface for use by an application program in a peer-to-peer computing system to import a file representing a peer-to-peer group database, comprising:
  receiving from the application program a peer-to-peer import database call having a plurality of parameters comprising a peer-to-peer group handle corresponding to a peer-to-peer peer group to which a user is unconnected, a path to a file to import and a password used to decrypt the peer-to-peer group database;
  parsing the peer-to-peer import database call to retrieve the plurality of parameters;
  imparting the plurality of parameters to a version of a peer-to-peer grouping infrastructure established by a peer group startup function call; and
  returning to the application program a value indicative of the success/failure of the peer-to-peer import database call corresponding to the imparted plurality of parameters.

63. A computer-readable storage medium tangibly embodying a program of instruction executable by a computer for performing steps to provide an interface for use by an application program in a peer-to-peer computing system for managing peer-to-peer groups, comprising:
  receiving from the application program a peer-to-peer group utility function call having a plurality of parameters, the peer-to-peer group utility function call including one from the set consisting of: an enumeration support call operating on a received peer group enumeration handle and a memory support call for freeing data from a grouping API;
  parsing the peer-to-peer group utility function call to retrieve the plurality of parameters;
  imparting the plurality of parameters to a version of a peer-to-peer grouping infrastructure established by a peer group startup function call; and
  returning to the application program a value indicative of the success/failure of the peer-to-peer group utility function call corresponding to the imparted plurality of parameters.

64. The computer-readable medium of claim 63, further comprising receiving from the application program a get next item call having a plurality of call parameters comprising the received peer group enumeration handle, a count of a number of items to read from an enumeration corresponding to the received peer group enumeration handle, and a pointer to an array of items to be read from the enumeration.

65. The computer-readable medium of claim 63, further comprising receiving from the application program an end enumeration call having a plurality of call parameters comprising the received peer group enumeration handle corresponding to an enumeration to cleanup.

66. The computer-readable medium of claim 63, further comprising receiving from the application program a get item count call having a plurality of call parameters comprising the received peer group enumeration handle, and a count of a number of records in an enumeration corresponding to the received peer group enumeration handle.

67. The computer-readable medium of claim 63, further comprising receiving from the application program a free data call having a plurality of call parameters comprising a pointer to an item to be freed of the data from the grouping API.

68. A computer-readable storage medium tangibly embodying a program of instruction executable by a computer for performing steps to provide an interface for use by an application program in a peer-to-peer computing system to communicate without flooding between a first and a second group member node of a peer-to-peer group, comprising:
  receiving from the application program a peer-to-peer group direct communication management call having a plurality of parameters;
  parsing the peer-to-peer group direct communication management call to retrieve the plurality of parameters;
  imparting the plurality of parameters to a version of a peer-to-peer grouping infrastructure established by a peer group startup function call by utilizing peer communication information corresponding to an opened connection between the first and the second group member nodes, the peer communication information including a type of the opened connection, a connection identification of the opened connection, a member identification of the second group member node, a peer identification of the first group member node, and an address of the opened connection; and
  returning to the application program a value indicative of the success/failure of the peer-to-peer group direct communication management call corresponding to the imparted plurality of parameters.

69. The computer-readable medium of claim 68, further comprising receiving from the application program an open direct communication call having a plurality of call parameters comprising a peer-to-peer group handle corresponding to the peer-to-peer group, an unique identification of a person to whom to connect at a given address, a pointer to a structure containing details about the person to whom to connect, and a connection identification of a direct connection.

70. The computer-readable medium of claim 68, further comprising receiving from the application program a close direct connection call having a plurality of call parameters comprising a peer-to-peer group handle corresponding to the peer-to-peer group, and an identification of a neighbor from whom to disconnect.

71. The computer-readable medium of claim 68, further comprising receiving from the application program a send data call having a plurality of call parameters comprising a peer-to-peer group handle corresponding to the peer-to-peer group, a unique identifier for the opened connection on which to send data, an application defined type of data to be sent, a count of bytes of the data, and the data to send to the neighbor.

72. The computer-readable medium of claim 68, further comprising receiving from the application program an enumerate connections call having a plurality of call parameters comprising a peer-to-peer group handle corresponding to the peer-to-peer group, a type of connection to enumerate, and a pointer to an enumeration of the connections.

73. A computer-readable storage medium tangibly embodying a program of instruction executable by a computer for performing steps to provide an interface for use by an application program in a peer-to-peer computing system to allow the application program to be notified about changes to a peer-to-peer group to which a group member node corresponding to the application program belongs and changes to data associated with the peer-to-peer group, comprising:
ensuring that registration information exists corresponding to the application program, the registration information including an event type for which the application program desires to be notified;
receiving from the application program a peer-to-peer events infrastructure management call having a plurality of parameters, the peer-to-peer events infrastructure management call for managing a notification of an event, the event including a change to the peer-to-peer group or a change to the data associated with the peer-to-peer group;
parsing the peer-to-peer events infrastructure management call to retrieve the plurality of parameters;
imparting the plurality of parameters to a version of a peer-to-peer grouping infrastructure established by a peer group startup function; and
returning to the application program a value indicative of the success/failure of the peer-to-peer events infrastructure management call corresponding to the imparted plurality of parameters.

74. The computer-readable medium of claim 73, further comprising receiving from the application program a register event call having a plurality of call parameters comprising a peer-to-peer group handle corresponding to the peer-to-peer group, an NT event handle to be signaled on a new event, a count of peer event registration structures, an array of peer event registration structures containing data about notifications being requested, a pointer to a peer event handle that can be used in a call to un- register a notification.

75. The computer-readable medium of claim 73, farther comprising receiving from the application program an un- register event call having a plurality of call parameters comprising a peer event handle of the event to un-register.

76. The computer-readable medium of claim 73, farther comprising receiving from the application program a get event data call having a plurality of call parameters comprising a peer event handle, and a pointer to the event data.

77. A method of providing an interface for use by an application program in a peer-to-peer computing system to manage time associated with a peer-to-peer group, comprising the steps of:
receiving from the application program a group peer time to universal time call having a plurality of parameters, the plurality of call parameters including a group handle corresponding to the peer-to-peer group and a group peer time corresponding to the peer-to- peer group;
parsing the group peer time to universal time call to retrieve the plurality of parameters;
imparting the plurality of parameters to a version of a peer-to-peer grouping infrastructure established by a peer group startup function call; and
returning to the application program a value indicative of the success/failure of the group peer time to universal time call corresponding to the imparted plurality of parameters, including the universal time corresponding to the group peer time if the value is indicative of success.

78. A method of providing an interface for use by an application program in a peer-to-peer computing system to manage time associated with a peer-to-peer group comprising the steps of:
receiving from the application program a group universal time to peer time call having a plurality of parameters, the plurality of parameters including a group handle corresponding to the peer-to-peer group and a group universal time;
parsing the group universal time to peer time call to retrieve the plurality of parameters;
imparting the plurality of parameters to a version of a peer-to-peer grouping infrastructure established by peer group startup function call; and
returning to the application program a value indicative of the success/failure of the group universal time to peer time call corresponding to the imparted plurality of parameters, including the peer time corresponding to the group universal time if the value is indicative of success.

79. A computer-readable storage medium tangibly embodying a program of instruction executable by a computer for performing steps to provide an interface for use by an application program in a peer-to-peer computing system to manage time associated with a peer-to-peer group, comprising the steps of:
receiving from the application program a group peer time to universal time call having a plurality of parameters, the plurality of call parameters including a group handle corresponding to the peer-to-peer group and a group peer time corresponding to the peer-to- peer group;
parsing the group peer time to universal time call to retrieve the plurality of parameters;
imparting the plurality of parameters to a version of a peer-to-peer grouping infrastructure established by a peer group startup function call; and
returning to the application program a value indicative of the success/failure of the group peer time to universal time call corresponding to the plurality of parameters, including the universal time corresponding to the group peer time if the value is indicative of success.

80. A computer-readable storage medium tangibly embodying a program of instruction executable by a computer for performing steps to provide an interface for use by an application program in a peer-to-peer computing system to manage time associated with a peer-to-peer group, comprising the steps of:

receiving from the application program a group universal time to peer time call having a plurality of parameters, the plurality of call parameters including a group handle corresponding to the peer-to-peer group and a group universal time corresponding to the peer-to-peer group;

parsing the group universal time to peer time call to retrieve the plurality of parameters;

imparting the plurality of parameters to a version of a peer-to-peer grouping infrastructure established by a peer group startup function call; and returning to the application program a value indicative of the success/failure of the group universal time to peer time call corresponding to the plurality of parameters, including the peer time corresponding to the group universal time if the value is indicative of success.

* * * * *

UNITED STATES PATENT AND TRADEMARK OFFICE
CERTIFICATE OF CORRECTION

PATENT NO. : 7,596,625 B2  Page 1 of 1
APPLICATION NO. : 10/351905
DATED : September 29, 2009
INVENTOR(S) : Manion et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1357 days.

Signed and Sealed this

Fourteenth Day of December, 2010

David J. Kappos
*Director of the United States Patent and Trademark Office*